US008059219B2

(12) United States Patent
Pak

(10) Patent No.: US 8,059,219 B2
(45) Date of Patent: Nov. 15, 2011

(54) LIQUID CRYSTAL DISPLAY AND DRIVING METHOD OF THE SAME

(75) Inventor: Sang-Jin Pak, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 583 days.

(21) Appl. No.: 12/238,609

(22) Filed: Sep. 26, 2008

(65) Prior Publication Data

US 2009/0086116 A1 Apr. 2, 2009

(30) Foreign Application Priority Data

Sep. 28, 2007 (KR) ........................ 10-2007-0098166

(51) Int. Cl.
*G02F 1/1343* (2006.01)

(52) U.S. Cl. ............................... 349/38; 349/43; 345/90

(58) Field of Classification Search ........................ None
See application file for complete search history.

(56) References Cited

U.S. PATENT DOCUMENTS

| | | | | |
|---|---|---|---|---|
| 2002/0008685 | A1 | 1/2002 | Ban et al. | |
| 2005/0035938 | A1 | 2/2005 | Noda | |
| 2008/0024689 | A1 * | 1/2008 | Ahn | 349/43 |
| 2008/0055222 | A1 * | 3/2008 | Chen et al. | 345/90 |
| 2009/0002357 | A1 * | 1/2009 | John et al. | 345/212 |

FOREIGN PATENT DOCUMENTS

| | | | |
|---|---|---|---|
| EP | 1 241 655 | A3 | 10/2007 |
| EP | 1 796 073 | A3 | 12/2007 |
| EP | 1 918 905 | A1 | 5/2008 |
| GB | 2434686 | A * | 8/2007 |
| KR | 100745406 | | 7/2007 |

OTHER PUBLICATIONS

European Search Report dated Feb. 11, 2009; Application No./Patent No. 08016535.0-1228.

* cited by examiner

*Primary Examiner* — Hemang Sanghavi
(74) *Attorney, Agent, or Firm* — Cantor Colburn LLP

(57) ABSTRACT

A liquid crystal display (LCD) and a driving method of the same. The LCD includes a liquid crystal capacitor charged with a data voltage during a first turn-on period of a first gate signal, a storage capacitor having one electrode connected to the liquid crystal capacitor and a driving unit which supplies a boost voltage to the other electrode of the storage capacitor during a boost voltage-output period of a boost-control signal. The boost voltage has a first edge and a second edge, the first and second edges occur in the boost voltage-output period, and the first turn-on period occurs between the first and second edges.

18 Claims, 15 Drawing Sheets

< FORWARD-SCAN MODE >

< FORWARD-SCAN MODE >

< REVERSE-SCAN MODE >

LIQUID CRYSTAL DISPLAY AND DRIVING METHOD OF THE SAME

This application claims priority to Korean Patent Application No. 10-2007-0098166 filed on Sep. 28, 2007, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display and a driving method of the same.

2. Description of the Related Art

A conventional liquid crystal display ("LCD") includes a liquid crystal capacitor connected to a gate line and charged with a data voltage, and a storage capacitor connected to the liquid crystal capacitor and maintaining the voltage of the liquid crystal capacitor. An image is displayed according to the voltage of the liquid crystal capacitor.

A LCD which displays an image not to be reversed even if a liquid crystal panel is turned around is in demand.

BRIEF SUMMARY OF THE INVENTION

The present invention has been made in an effort to solve the above-stated problem, and aspects of the present invention provide a liquid crystal display for reducing power consumption in a forward-scan mode and/or a reverse-scan mode, and a method of a liquid crystal display for reducing power consumption in a forward-scan mode and/or a reverse-scan mode forward-scan mode.

In an exemplary embodiment, the present invention provides a liquid crystal display which includes a liquid crystal capacitor charged with a data voltage during a first turn-on period of a first gate signal, a storage capacitor having one electrode connected to the liquid crystal capacitor, and a driving unit which supplies a boost voltage to the other electrode of the storage capacitor during a boost voltage-output period of a boost-control signal, the boost voltage includes a first edge and a second edge, the first and second edges occur in the boost voltage-output period, and the first turn-on period occurs between the first and second edges.

In another exemplary embodiment, the present invention provides a liquid crystal display which includes first to n-th gate lines, a liquid crystal capacitor connected to the i(1≦i≦n)-th gate line, a storage capacitor having one electrode connected to the liquid crystal capacitor, and a gate driver which supplies first to n-th gate signals to the first to n-th gate lines and supplies a boost voltage to the other electrode of the storage capacitor during a boost voltage-output period of a boost-control signal, each of the first to n-th gate signals having first to n-th turn-on period, respectively, the liquid crystal capacitor is charged with a data voltage during the i-th turn-on period, and the voltage of the liquid crystal capacitor is boosted up or decreased according to the boost voltage after the i-th turn-on period in the forward-scan the mode in which the first to n-th turn-on period begins sequentially, or in the reverse-scan mode in which the n-th to first turn-on period begins sequentially.

In another exemplary embodiment, the present invention provides a method of driving a liquid crystal display including first to n-th gate lines, a liquid crystal capacitor connected to the i(1≦i≦n)-th gate line and a storage capacitor having one electrode connected to the liquid crystal capacitor, the method includes supplying an i-th gate signal having an i-th turn-on period to the i-th gate line, and supplying a boost voltage to the other electrode of the storage capacitor during a boost voltage-output period of boost-control signal, the boost voltage includes a first edge and a second edge, the first and second edges occur in the boost voltage-output period, and the first turn-on period occurs between the first and second edges.

BRIEF DESCRIPTION OF THE DRAWINGS

The above and/or other aspects, features, and advantages of the present invention will become more apparent from the following detailed description when taken in conjunction with the accompanying drawings, in which.

DETAILED DESCRIPTION OF THE INVENTION

Figure 1:
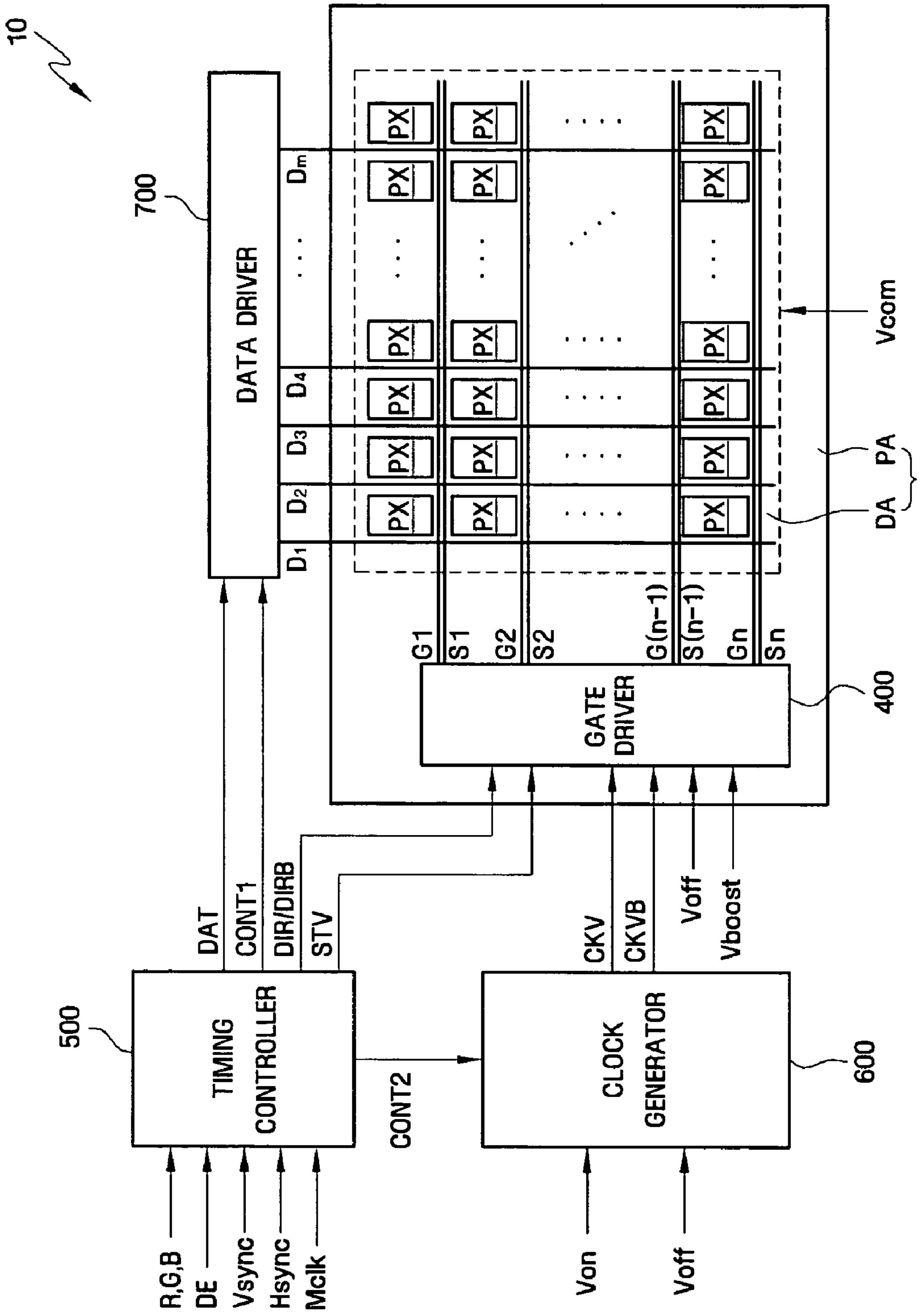
FIG. 1 is a block diagram of an exemplary embodiment of a liquid crystal display according to the present invention.

The invention is described more fully hereinafter with reference to the accompanying drawings, in which exemplary embodiments of the invention are shown. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

A liquid crystal display according to an exemplary embodiment of the present invention and a driving method of the same will hereinafter be described in further detail with reference to FIGS. 1 through 7.

Figure 2:
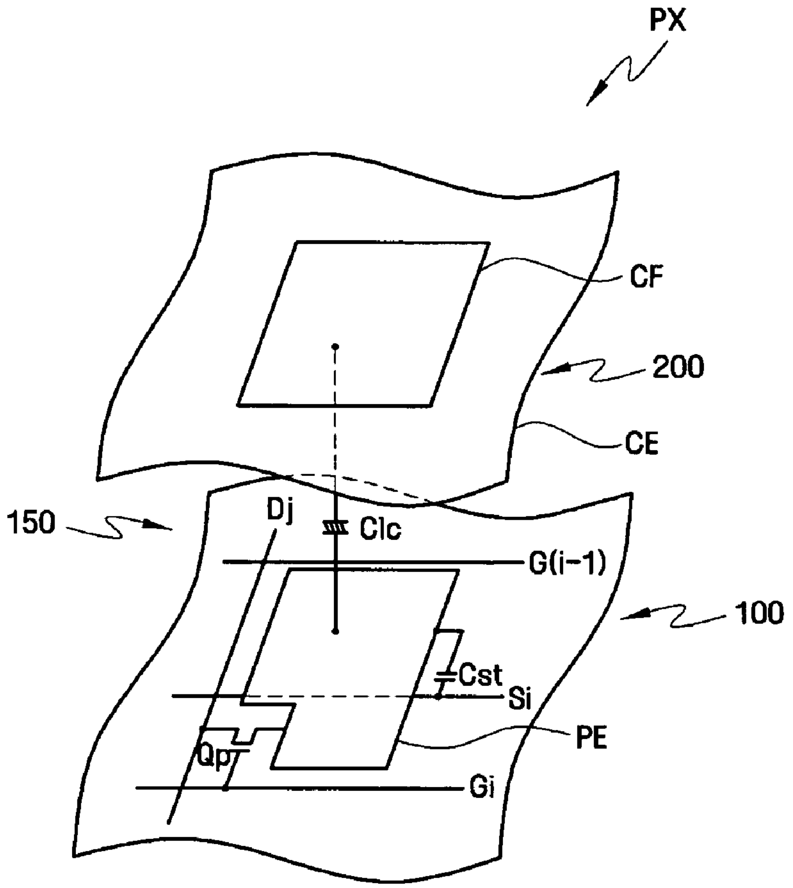
FIG. 2 is an equivalent circuit diagram of an exemplary embodiment of one pixel of the liquid crystal display according to the present invention in FIG. 1.
Figure 3:
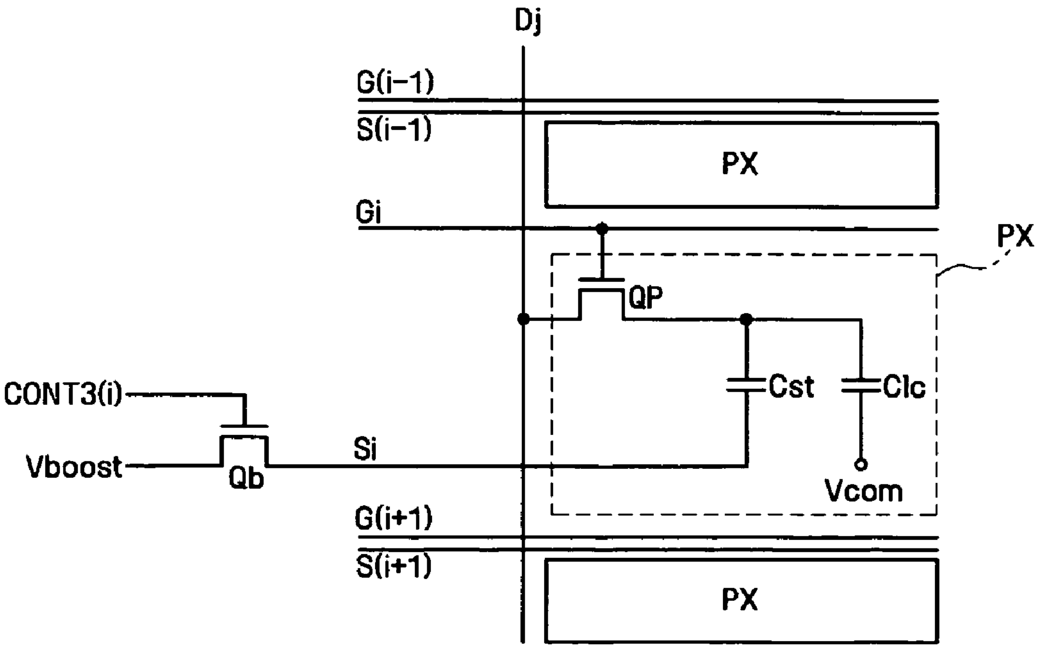
FIG. 3 is a schematic circuit diagram of an exemplary embodiment of an operation of the liquid crystal display in FIG. 1.
Figure 4A:
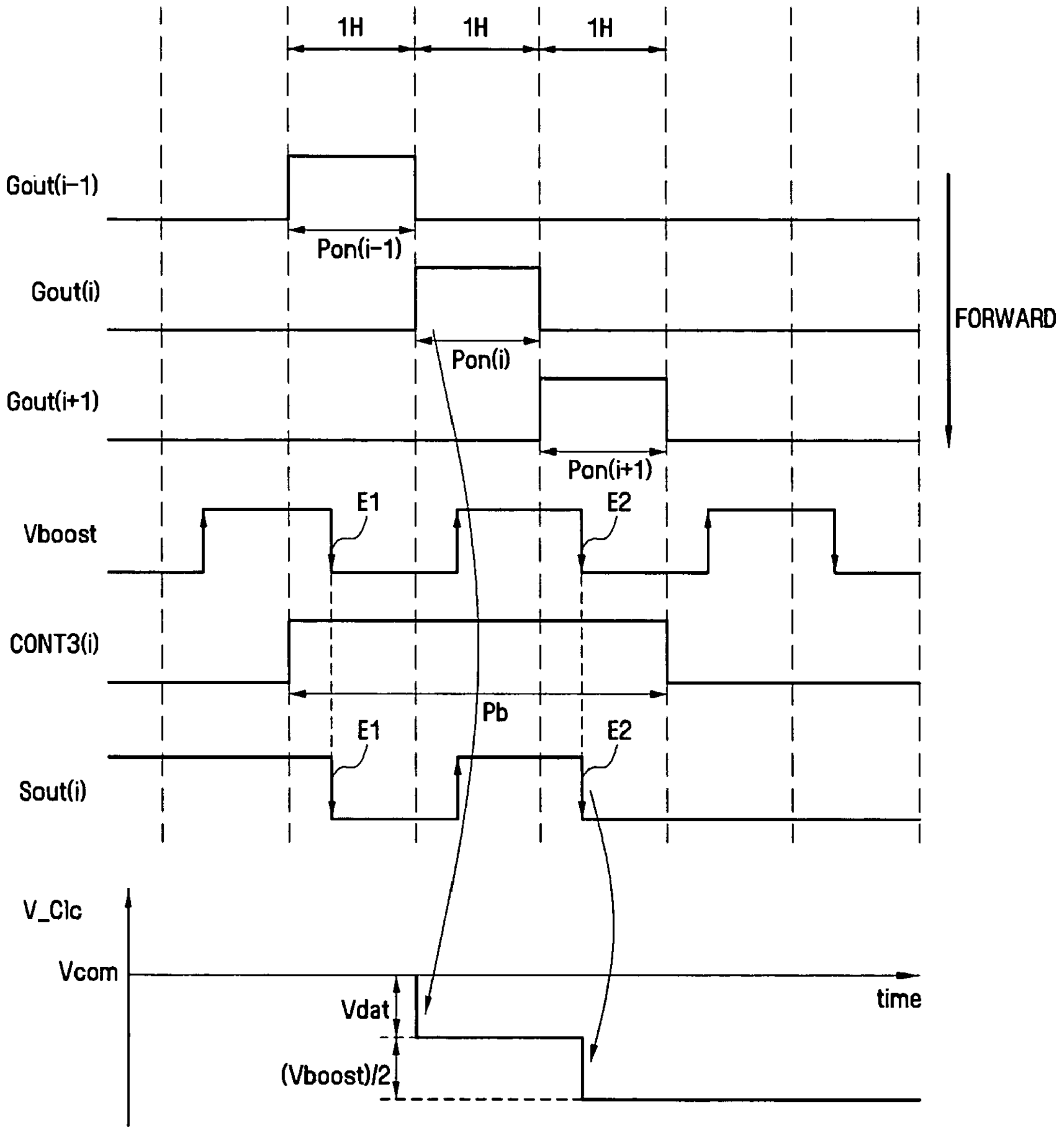
FIGS. 4A and 4B are signal waveform timing charts of an exemplary embodiment of an operation of the liquid crystal display in FIG. 3.
Figure 4B:
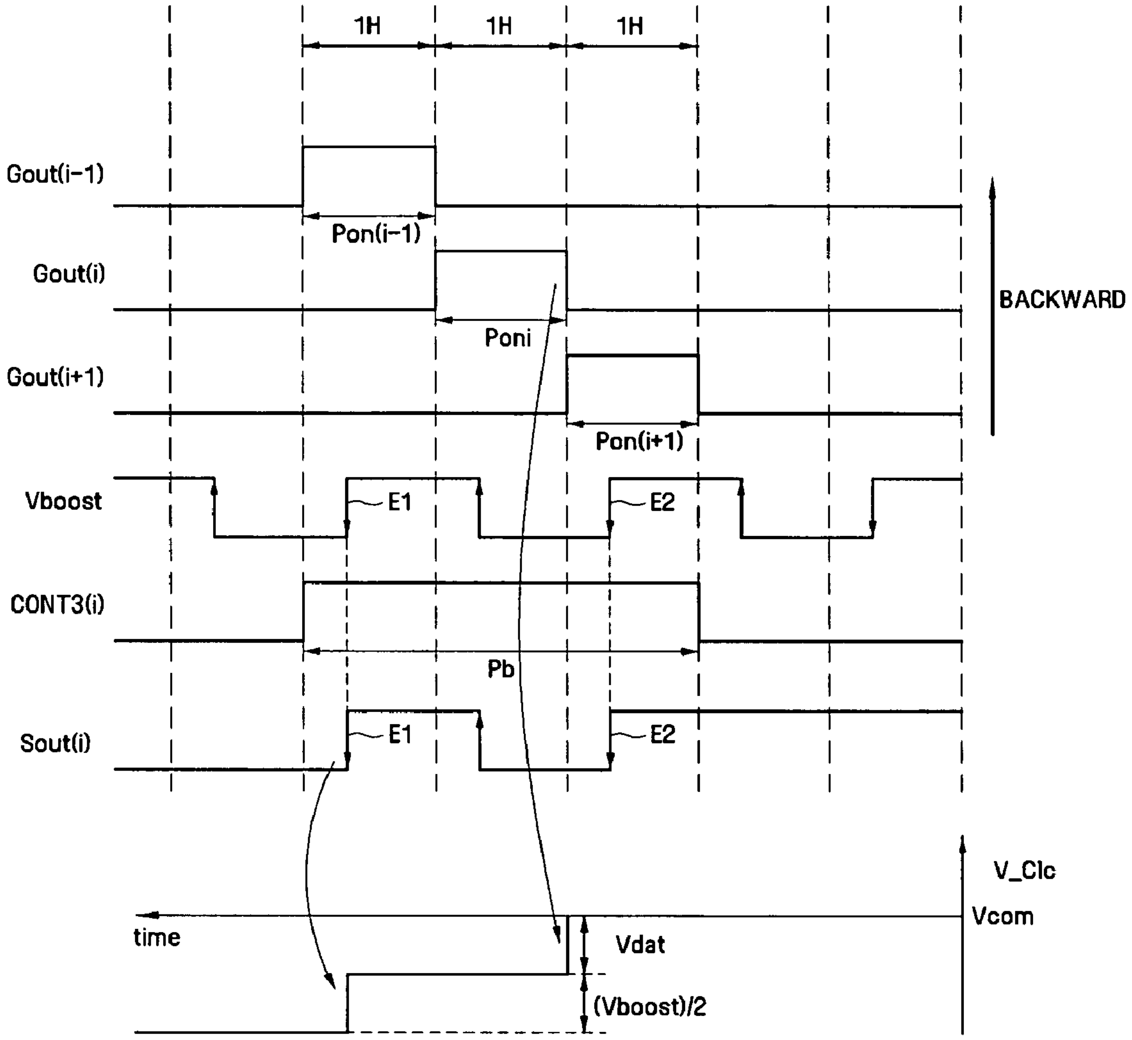
Figure 5:
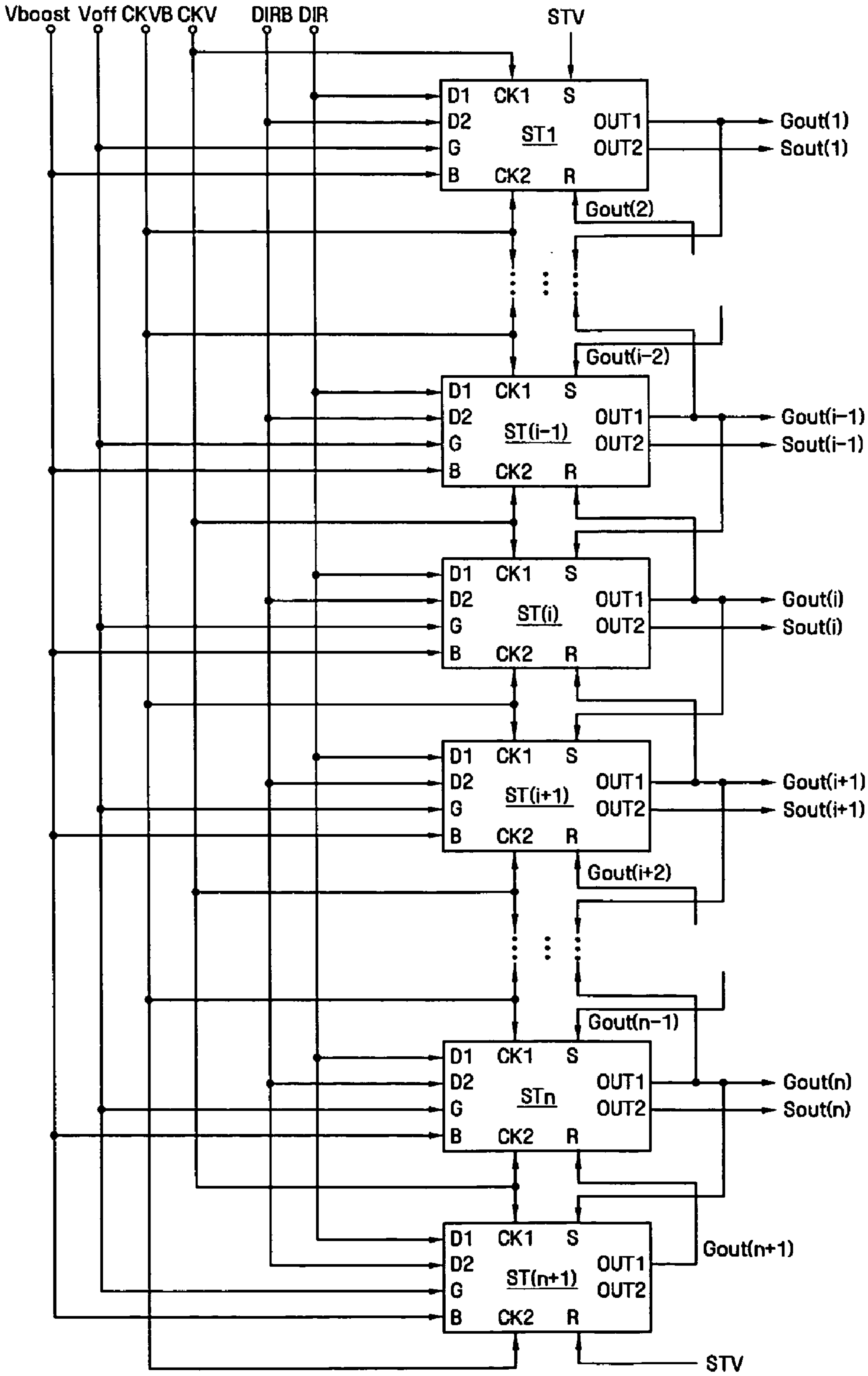
FIG. 5 is a block diagram of an exemplary embodiment of the gate driver in FIG. 3, according to the present invention.
Figure 6:
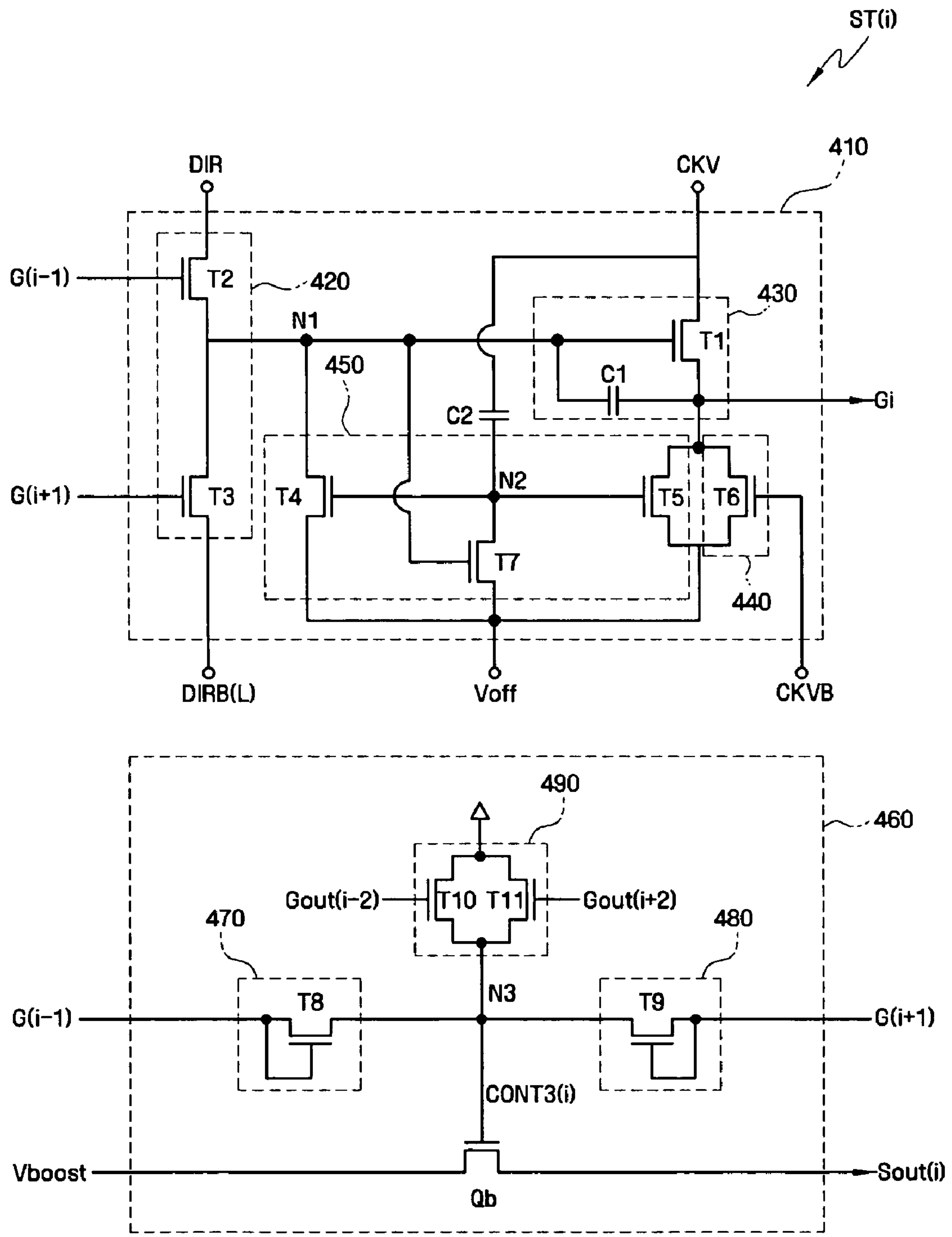
FIG. 6 is an equivalent schematic circuit diagram of an exemplary embodiment of the gate driver in FIG. 3, according to the present invention.
Figure 7:
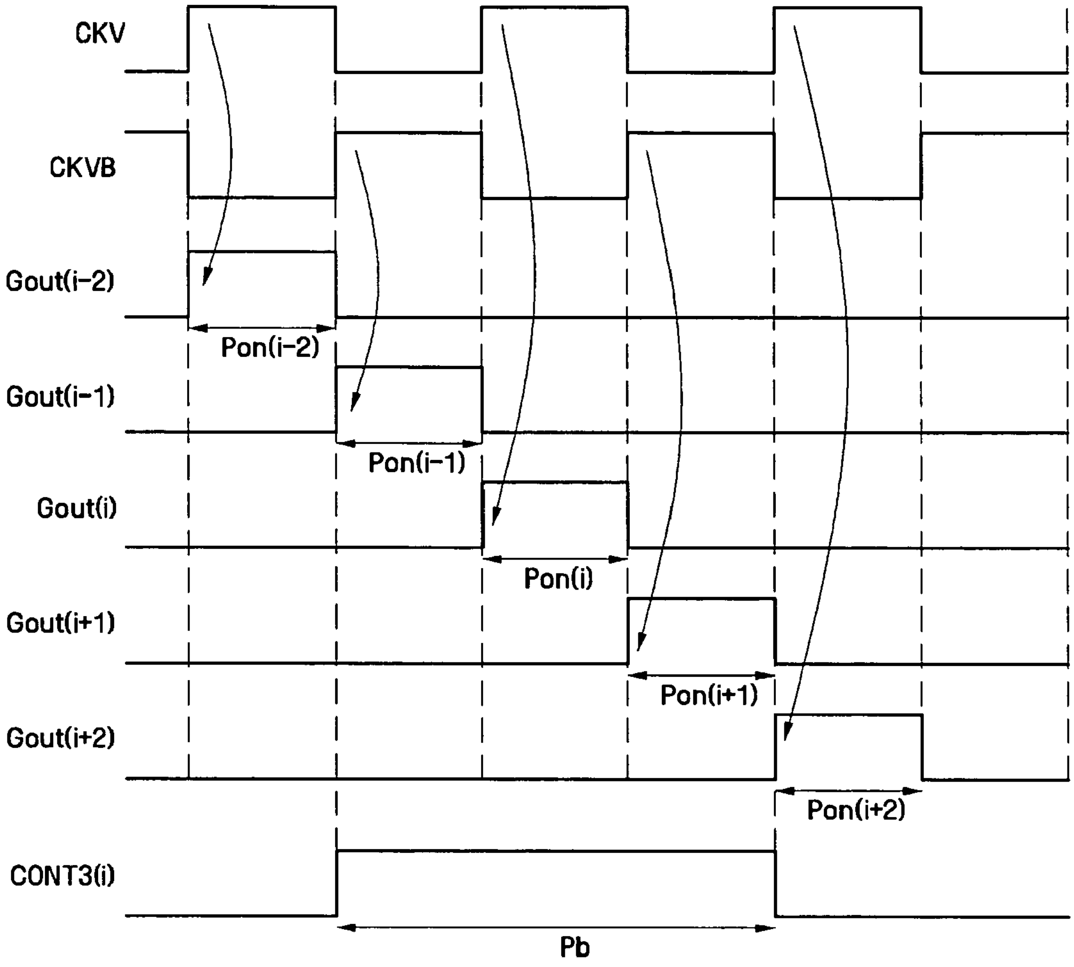
FIG. 7 is a signal waveform timing chart of an exemplary embodiment of an operation of the i-th stage in FIG. 6, according to the present invention.

FIG. 1 is a block diagram of an exemplary embodiment of a liquid crystal display according to the present invention. FIG. 2 is an equivalent circuit diagram of an exemplary embodiment of one pixel of the liquid crystal display according to the present invention in FIG. 1. FIG. 3 is a schematic circuit diagram illustrating an exemplary embodiment of an operation of the liquid crystal display in FIG. 1. FIGS. 4A and 4B are signal waveform timing charts illustrating an exemplary embodiment of an operation of the liquid crystal display in FIG. 3. FIG. 5 is a block diagram of an exemplary embodiment of a gate driver in FIG. 3. FIG. 6 is an equivalent schematic circuit diagram of an exemplary embodiment of the gate driver in FIG. 3. FIG. 7 is a signal waveform timing chart illustrating an exemplary embodiment of an operation of the i-th stage in FIG. 6.

Referring to FIG. 1, an exemplary embodiment of an LCD 10 according to the present invention comprises a liquid crystal panel 300, a timing controller 500, a clock generator 600, a gate driver 400 and a data driver 700.

The liquid crystal panel 300 is divided into a display area DA, where an image is displayed, and a non-display area PA, where an image is not displayed.

The display area DA includes a first substrate 100, which includes a plurality of gate lines G1 to Gn, a plurality of data lines D1 to Dm, a plurality of storage lines S1 to Sn, a pixel-switching element Qp (see FIG. 2) and pixel electrodes PE formed thereon, a second substrate 200, which includes color filters CF and a common electrode CE formed thereon and a liquid crystal layer 150 interposed between the first substrate 100 and the second substrate 200, such that an image is displayed within the display area DA. The gate lines G1 to Gn and the storage lines S1 to Sn extend in a first direction i.e., a row direction, so as to be substantially in parallel with one another, and the data lines D1 to Dm extend in a second direction, i.e., a column direction, so as to be substantially in parallel with one another. In exemplary embodiments of the present invention, the first direction is substantially perpendicular to the second direction.

Referring to FIG. 2, in exemplary embodiments, a pixel PX includes a color filter CF which may be formed on an area of the common electrode CE of the second substrate 200, such that the color filter CF is disposed to face the pixel electrode PE of the first substrate 100. In an exemplary embodiment, the pixel PX, which is connected to an i-th gate line Gi (i=1 to n) and to a j-th data line Dj (j=1 to m), includes the pixel-switching element Qp, which is connected to a signal line Gi, Dj, and the liquid crystal capacitor Clc and a storage capacitor Cst which are connected to the pixel-switching element Qp. In alternative exemplary embodiments, the pixel-switching element Qp may be a thin film transistor ("a-Si TFT") made from amorphous silicon. Specifically, one electrode of the storage capacitor Cst is connected to the liquid crystal capacitor Clc, the other electrode of the storage capacitor Cst is connected to the storage line Si.

As shown in FIG. 2, according to an exemplary embodiment, the first substrate 100 is larger in size than the second substrate 200, such that the non-display area PA does not display an image.

The timing controller 500 receives input RGB image signals and an input-control signal, which controls display of an image, from a graphics controller (not shown), and supplies an image signal DAT and a data control signal CONT1 to the data driver 700. In the current exemplary embodiment, the timing controller 500 receives the input control signal which includes, for example, a horizontal sync signal Hsync, a main clock signal Mclk and a data enable signal DE, and the timing controller 500 supplies the data control signal CONT1 to the data driver 700. In the current exemplary embodiment, the data control signal CONT1 controls an operation of the data driver 700, and includes, for example, a horizontal start signal which starts an operation of data driver 700 and a load signal which instructs an output of two data voltages. However, the present invention is not limited thereto, and may vary as necessary.

The data driver 700 receives the image signal DAT and the data control signal CONT1, and the data driver 700 supplies an image data voltage corresponding to the image signal DAT to the lines D1 to Dm. In the current exemplary embodiment, the data driver 700 is an integrated circuit ("IC"), and is connected to the liquid crystal panel 300 in a tape carrier package ("TCP") manner, however, the present invention is not limited thereto, and may vary as necessary. In another exemplary embodiment, the data driver 700 may be formed on the non-display area PA of the liquid crystal panel 300.

Furthermore, the timing controller 500 supplies a clock-generation-control signal CONT2 to the clock generator 600, and supplies a scan-start signal STV and scan-direction-control signals DIR, DIRB to the gate driver 400. The clock-generation-control signal CONT2 includes a gate clock signal (not shown) which determines a timing when the gate on voltage Von is output, an output enable signal (not shown) which determines the pulse width of the gate-on voltage Von, for example, but is not limited thereto, and may vary as necessary.

The scan-direction-control signals DIR, DIRB may control sequence of a turn-on period when the gate-on voltage Von is applied to each of the gate lines G1~Gn. For example, when a first scan-direction-control signal DIR is at a high level and a second scan-direction-control signal DIRB is at a low level ("forward-scan mode"), a first turn-on period of the first gate line G1 begins first, a second turn-on period of the second gate line G2 follows the first turn-on period, and third to n-th turn-on periods of the third to n-th gate lines G3~Gn begin sequentially. When a first scan-direction-control signal DIR is at a low level and a second scan-direction-control signal DIRB is at a high level ("reverse-scan mode"), an n-th turn-on period of the n-th gate line Gn begins first, a (n−1)th turn-on period of the (n−1)th gate line G(n−1) follows the n-th turn-on period, and (n−2)th to first turn-on periods of the (n−2) to first gate lines G(n−2)~G1 begin sequentially.

The clock generator 600 receives the clock-generation-control signal CONT2, and outputs the clock signal CKV and the clock bar signal CKVB which swings between the gate-on voltage Von and the gate-off voltage Voff. In the current exemplary embodiment, the clock signal CKV is an inverse-phase signal of the clock bar signal CKVB.

The gate driver 400 receives scan-start signal STV, scan-direction-control signals DIR, DIRB, the clock signal CKV and the clock bar signal CKVB and the gate-off voltage Voff, and supplies the gate signals to the gate lines G1~Gn, respectively. Furthermore, the gate driver 400 supplies a boost voltage Vboost to the storage lines S1~Sn sequentially. The gate driver 400 will be described later in more detail with reference to FIGS. 5 through 7.

The operation of the liquid crystal display 10 will now described in more detail with reference to FIGS. 3 and 4A.

Referring to FIG. 3, the liquid crystal display 10 includes (i−1)th to (i+1)th gate lines G(i−1)~G(i+1), (i−1)th to (i+1)th storage lines S(i−1)~S(i+1) and pixels connected to the gate lines G(i−1)~G(i+1) and the storage lines S(i−1)~S(i+1). Each of the pixels includes the liquid crystal capacitor Clc and the storage capacitor Cst. One electrode of the liquid crystal capacitor Clc is connected to the pixel-switching element Qp, and the other electrode of the liquid crystal capacitor Clc receives a common voltage Vcom. One electrode of the storage capacitor Cst is connected to the liquid crystal capacitor Clc, and the other electrode of the storage capacitor Cst is connected to the storage line Si. A boost-switching element Qb applies the boost voltage to the storage line Si in response to boost-control signal CONT3(i).

The operation of liquid crystal display 10 in a forward-scan mode will now be described in more detail with reference to FIGS. 3 and 4A.

First, the (i−1)th gate signal Gout(i−1) having the (i−1)th turn-on period Pon(i−1) is supplied to the (i−1)th gate line G(i−1). Then, the i-th gate signal Gout(i) having the i-th turn-on period Pon(i) is supplied to the i-th gate line G(i). The (i+1)th gate signal Gout(i+1) having the (i+1)th turn-on period Pon(i+1) is supplied to the (i+1)th gate line G(i+1). That is, the (i−1)th to (i+1)th turn-on period Pon(i−1)~Pon(i+1) begins sequentially. According to an exemplary embodiment, the turn-on period Pon(i−1)~Pon(i+1) is 1 horizontal period 1H. During each of the turn-on periods Pon(i−1)~Pon(i+1), the liquid crystal capacitor Clc is charged with the data voltage.

The boost voltage Vboost swings between the high level and the low level, and includes edges E1, E2. The edges E1, E2 are a rising edge or a falling edge, respectively.

The i-th boost-control signal CONT3(i) includes a boost voltage-output period Pb. For example, the i-th boost-control signal CONT3(i) may be at the high level during the boost voltage-output period. The boost-switching element Qb is turned on during the boost voltage-output period Pb, and supplies the boost voltage Vboost to the storage line Si. Here, the boost voltage Vboost which is transmitted to the storage line Si is referred to as a boost voltage Sout(i). Therefore, the boost voltage Sout(i) of the storage line Si is as shown in FIG. 4A. According to the current exemplary embodiment, the first and second edges E1, E2 occur in the boost voltage-output period Pb, the i-th turn-on period Pon(i) occurs between the first and second edges E1, E2. That is, the boost voltage-output period Pb overlaps with the first edge E1, the i-th turn-on period Pon(i) and the second edge E2.

The voltage V_Clc of the liquid crystal capacitor Clc is described as follows. When the i-th turn-on period Pon(i) begins, the pixel-switching element Qp is turned on, and then the liquid crystal capacitor Clc is charged with a data voltage Vdat. In the current exemplary embodiment, the data voltage Vdat may be negative with respect to the common voltage Vcom.

Next, the pixel-switching element Qp is turned off after the i-th turn-on period Pon(i), the second edge E2 of the boost voltage Vboost is applied to the other of the storage capacitor Cst. When the falling edge E2 is applied to the other of the storage capacitor Cst, the voltage of the storage capacitor Cst is lowered, and the voltage of the liquid crystal capacitor Clc connected to the storage capacitor Cst is lowered. For example, the capacitance of the storage capacitor Cst and the capacitance of the liquid crystal capacitor Clc are same, the voltage of the liquid crystal capacitor Clc is lowered by Vboost/2 at the falling edge E2.

That is, the voltage of the liquid crystal capacitor Clc is decreased by the second edge E2, which is applied to the other of the storage capacitor Cst after the i-th turn-on period Pon(i) so that the difference between the boosted voltage of the liquid crystal capacitor Clc and the common voltage Vcom becomes large. The difference between the boosted voltage of the liquid crystal capacitor Clc and the common voltage Vcom becomes larger than that of between the data voltage Vdat and the common voltage Vcom, and thus, power consumption is reduced.

The operation of liquid crystal display 10 in a reverse-scan mode is described in more detail in the following with reference to FIGS. 3 and 4B.

First, the (i+1)th gate signal Gout(i+1) having the (i+1)th turn-on period Pon(i+1) is supplied to the (i+1)th gate line G(i+1). Then, the i-th gate signal Gout(i) having the i-th turn-on period Pon(i) is supplied to the i-th gate line G(i). Next, the (i−1)th gate signal Gout(i−1) having the (i−1)th turn-on period Pon(i−1) is supplied to the (i−1)th gate line G(i−1). That is, the (i+1)th to (i−1)th turn-on period Pon(i+1)~Pon(i−1) begins sequentially.

According to an exemplary embodiment, the boost voltage Vboost comprises edges E1, E2.

The i-th boost-control signal CONT3(i) comprises a boost voltage-output period Pb. The first and second edges E1, E2 occur in the boost voltage-output period Pb, the i-th turn-on period Pon(i) occurs between the first and second edges E1, E2. That is, the boost voltage-output period Pb overlaps with the first edge E1, the i-th turn-on period Pon(i) and the second edge.

The voltage V_Clc of the liquid crystal capacitor Clc is described in the following. When the i-th turn-on period Pon(i) initiates, the pixel-switching element Qp is turned on, and then the liquid crystal capacitor Clc is charged with a data voltage Vdat. In the current exemplary embodiment, the data voltage Vdat may be negative with respect to the common voltage Vcom.

Next, the pixel-switching element Qp is turned off after the i-th turn-on period Pon(i), the first edge E1 of the boost voltage Vboost is applied to the other of the storage capacitor Cst. When the falling edge E1 is applied to the other of the storage capacitor Cst, the voltage of the storage capacitor Cst is lowered, and the voltage of the liquid crystal capacitor Clc connected to the storage capacitor Cst is lowered. For example, the capacitance of the storage capacitor Cst and the capacitance of the liquid crystal capacitor Clc are same, the voltage of the liquid crystal capacitor Clc is lowered by Vboost/2 at the falling edge E2.

Referring to FIGS. 4A, 4B, the boost voltage Vboost comprises the first edge E1 and the second edge E2 and the edges E1, E2 occur in the boost voltage-output period Pb so that the voltage V_Clc of the liquid crystal capacitor Clc is decreased or amplified in the forward-scan mode and/or in the reverse-scan mode. In the current exemplary embodiment, the boost voltage-output period Pb may overlap the (i−1)th to (i+1)th turn-on period Pon(i−1)~Pon(i+1).

The gate driver 400 is described below in more detail, where the gate driver 400 operates in the forward-scan mode is described.

Referring to FIGS. 1 and 5, the gate driver 400 includes a plurality of stages ST1 to STn+1, which are connected to one another in a cascade manner. Each of the stages ST1 to STn, except for the last stage STn+1, is connected to a respective corresponding gate line of the plurality of gate lines G1 to Gn and the storage line S(i), and the stages ST1 to STn output gate signals Gout(1) to Gout(n) and the boost voltage Sout(1) to Sout(n) during the boost voltage-output period Pb, respectively. Each of the stages ST1 to STn+1 receives the boost voltage Vboost, the gate-off voltage Voff, the clock signal CKV, the clock bar signal CKVB and the scan-direction-control signals DIR, DIRB. Each of the stages ST1 to STn+1 includes a first scan-direction terminal D1, a second scan-direction terminal D2, a first clock terminal CK1, a second clock terminal CK2, a set terminal S, a reset terminal R, a power-supply-voltage terminal G, a boost voltage terminal B, a gate-output terminal OUT1 and a storage-output terminal OUT2.

Among the stages ST1 to STn+1, a i-th(i≠1) stage STi, for example, includes a set terminal S to which a gate signal Gout(i−1) of a previous stage ST(i−1) is input, a reset terminal R to which a gate signal Gout(i+1) of a next stage ST(i+1) is input, a first clock terminal CK1 and a second clock terminal CK2 to which the first clock signal CKV and the clock bar signal CKVB are input, respectively, the power-supply voltage terminal G to which the gate-off voltage Voff is input, the first and second scan-direction terminals D1 and D2 to which the scan-direction-control signals DIR, DIRB are input, respectively, and the boost voltage terminal B to which the boost voltage Vboost is input. The first scan-direction-control signal DIR is at high level and the second scan-direction-control signal DIRB is at a low level. The i-th stage STi includes a gate-output terminal OUT1 through which a i-th gate signal Gout(i) is output, and a storage-output terminal OUT2 through which the boost voltage Sout(i) of the boost voltage-output period Pb is output.

According to an exemplary embodiment, the scan-start signal STV is input to the set terminal S of the first stage ST1.

A gate signal Gout(n+1) of the last stage ST(n+1) is input to a reset terminal R of the n-th stage STn. The scan-start signal STV is input to a reset terminal R of the last stage ST(n+1).

While, in the reverse-scan mode, the scan-start signal STV may be input to the reset terminal R of the (n+1)th stage ST(n+1), and the first scan-direction-control signal DIR may be at a low level and the second scan-direction-control signal DIRB may be at high level.

The i-th stage STi is described in the following in more detail with reference to FIGS. 6 and 7.

Referring to FIG. 6, the i-th stage STi includes a gate signal supplier 410 and a boost voltage supplier 460. The gate signal supplier 410 outputs the i-th gate signal Gout(i) to the i-th gate lines Gi, and the boost voltage supplier 460 outputs the boost voltage Sout(i) to the i-th storage line Si during the boost voltage-output period Pb.

According to an exemplary embodiment, the gate signal supplier 410 includes a pull-up-control unit 420, a pull-up unit 430, a pull-down unit 440, and a holding unit 450. In the forward-scan mode, the first scan-direction-control signal DIR is at high level and the second scan-direction-control signal DIRB is at a low level.

The pull-up-control unit 420 comprises transistors T2, and T3. The gate of the transistor T2 receives the (i−1)th gate signal Gout(i−1), and the transistor T2 outputs the first scan-direction-control signal DIR to a first node N1 in respond to the (i−1)th gate signal Gout(i−1). The gate of the transistor T3 receives the (i+1)th gate signal Gout(i+1), and the transistor T3 outputs the second scan-direction-control signal DIRB to the first node N1 in respond to the (i+1)th gate signal Gout (i+1).

The pull-up unit 430 comprises transistor T1 and a capacitor C1 which connect the gate and the source of the transistor T1. The gate of the transistor T1 is connected to the first node N1, the drain of the transistor T1 receives the clock signal CKV.

The pull-down unit 440 comprises a transistor T6, the drain of the transistor T6 is connected to the source of the transistor T1. The source of the transistor T6 receives the gate-off voltage Voff, and the gate of the transistor T6 receives the clock bar signal CKVB.

The holding unit 450 includes transistors T4, T5, and T7. The gate of the transistor T4 is connected to a second node N2, the drain of the transistor T4 is connected to the first node N1, and the source of the transistor T4 is connected to the gate-off voltage Voff. The gate of the transistor T5 is connected to the second node N2, the drain of the transistor T5 is connected to the source of the transistor T1, and the source of the transistor T5 is connected to the gate-off voltage Voff. The gate of the transistor T7 is connected to the first node N1, the drain of the transistor T7 is connected to the second node N2, and the source of the transistor T7 is connected to the gate-off voltage Voff. According to an exemplary embodiment, the transistors T1 through T7 are a-Si TFTs.

First, an operation in which the i-th gate signal Gout(i) transitions to the gate-on voltage Von from the gate-off voltage Voff is described in the following below.

During the (i−1)th turn-on period Pon(i−1), the transistor T2 of the pull-up-control unit 420 receives the (i−1)th gate signal Gout(i−1) and the transistor T2 is turned on. The transistor T2 outputs the first scan-direction-control signal DIR to the first node N1. That is, the capacitor C1 of the pull-up unit 430 is charged during the (i−1)th turn-on period Pon(i−1).

After the capacitor C1 of the pull-up unit 430 is charged, the transistor T1 is turned on and outputs the clock signal CKV as the i-th gate signal Gout(i) during the i-th turn-on period Pon(i)

Next, an operation in which the i-th gate signal Gout(i) is held at the high level is described in the following.

When the i-th gate signal Gout(i) is at high level, the transistor T7 of the holding unit 450 is turned on, and supplies the gate-off voltage Voff to the gates of the transistors T4 and T5. The transistor T4 is turned off and does not turn off the transistor T. Also, the transistor T5 is turned off and does not pull down the i-th gate signal Gout(i). That is, the holding unit 450 holds the i-th gate signal Gout(i) at high level during the i-th turn-on period Pon(i).

Next, an operation in which the i-th gate signal Gout(i) transitions to the gate-off voltage Voff from the gate-on voltage Von is described in the following.

During the (i+1)th turn-on period Pon(i+1), the transistor T6 of the pull-down unit 440 receives the clock bar signal CLKB and is turned on. The transistor T6 pulls down the i-th gate signal Gout(i) to the gate-off voltage Voff.

According to the current exemplary embodiment, the transistor T3 of the pull-up-control unit 420 receives the (i+1)th gate signal Gout(i+1), transistor T3 is turned on, and transistor T3 supplies the second scan-direction-control signal DIRB to the first node N1. Therefore, the level of the first node N1 is decreased to the low level, and the transistor T1 of the pull-up unit 430 is turned off.

Next, an operation in which the i-th gate signal Gout(i) is held at the low level is described in the following below.

When the voltage of the first node N1 is at a low level, the transistor T7 of the holding unit 450 is turned off and does not supply the gate-off voltage Voff to the second node N2. Thus, the voltage of the second node N2 varies according to the clock signal CKV. For example, when the clock signal CKV is at the high level, the second node N2 is at high level and the transistors T4 and T5 are turned on. The transistor T4 supplies the gate-off voltage Voff to first node N1 so that the transistor T1 of the pull-up unit 430 is turned off and the first capacitor C1 is discharged. Also, the transistor T5 holds the i-th gate signal Gout(i) to the gate-off voltage Voff.

That is, the gate driver 400, as shown in FIG. 7, outputs the clock signal CKV as the (i−2)th gate signal Gout(i−2) during the (i−2)th turn-on period Pon(i−2) and outputs the clock bar signal CKVB as the (i−1)th gate signal Gout(i−1) during the (i−1)th turn-on period Pon(i−1) and outputs the clock signal CKV as the i-th gate signal Gout(i) during the i-th turn-on period Pon(i), and outputs the clock bar signal CKVB as the (i+1)th gate signal Gout(i+1) during the (i+1)th turn-on period Pon(i+1), and outputs the clock signal CKV as the (i+2)th gate signal Gout(i+2) during the (i+2)th turn-on period Pon(i+2).

Next, the boost voltage supplier 460 is described below in more detail.

According to an exemplary embodiment, the boost voltage supplier 460 includes a first switching element 470, a second switching element 480 and a switching unit 490. The first switching element 470 is a diode-connected transistor T8. The second switching element 480 is a diode-connected transistor T9. The switching unit 490 includes transistors T10 and T11. According to the current exemplary embodiment, the transistors T8 through T11 are a-Si TFTs.

During the (i−2)th turn-on period Pon(i−2), the transistor T10 of the switching unit 490 is turned on and supplies the ground voltage to a third node N3. Thus, the i-th boost-control signal CONT3(i) is at low level during the (i−2)th turn-on period Pon(i−2). At this time, the transistors T8, T9, and T11 are turned off.

During the (i−1)th turn-on period Pon(i−1), the diode-connected transistor T8 supplies (i−1)th gate signal Gout(i−1) to the third node N3. Thus, the i-th boost-control signal CONT3(i) is at high level during the (i−1)th turn-on period Pon(i−1). At this time, the transistors T9, T10, and T11 are turned off.

During (i+1)th turn-on period Pon(i+1), the diode-connected transistor T9 supplies the (i+1)th gate signal Gout(i+1) to the third node N3. Thus, the i-th boost-control signal CONT3(i) is at high level during the (i+1)th turn-on period Pon(i+1). At this time, the transistors T8, T10, and T11 are turned off.

During the (i+2)-th turn-on period Pon(i+2), the transistor T11 of the switching unit 490 is turned on and supplies the ground voltage to the third node N3. Thus, the i-th boost-control signal CONT3(i) is at low level during the (i+2)th turn-on period Pon(i+2). At this time, the transistors T8, T9, and T10 are turned off.

That is, the i-th boost-control signal CONT3(i) is at high level during the boost voltage-output period Pb as shown in the FIGS. 4A, 4B, and 7. In the above exemplary embodiments, the switching unit 490 includes two transistors T10 and T11, and each transistor operates in response to the (i−2)th gate signal Gout(i−2) or the (i+2)th gate signal Gout(i+2). However, the present invention is not limited thereto. For example, the switching unit 490 may include at least one transistor and supply the ground voltage during the period except for the (i−1)th turn-on period Pon(i−1) and the (i+1)th turn-on period Pon(i+1).

An LCD and a method of driving the same according to another exemplary embodiment of the present invention is described hereinafter in further detail with reference to FIGS. 8 through 11B.

Figure 8:
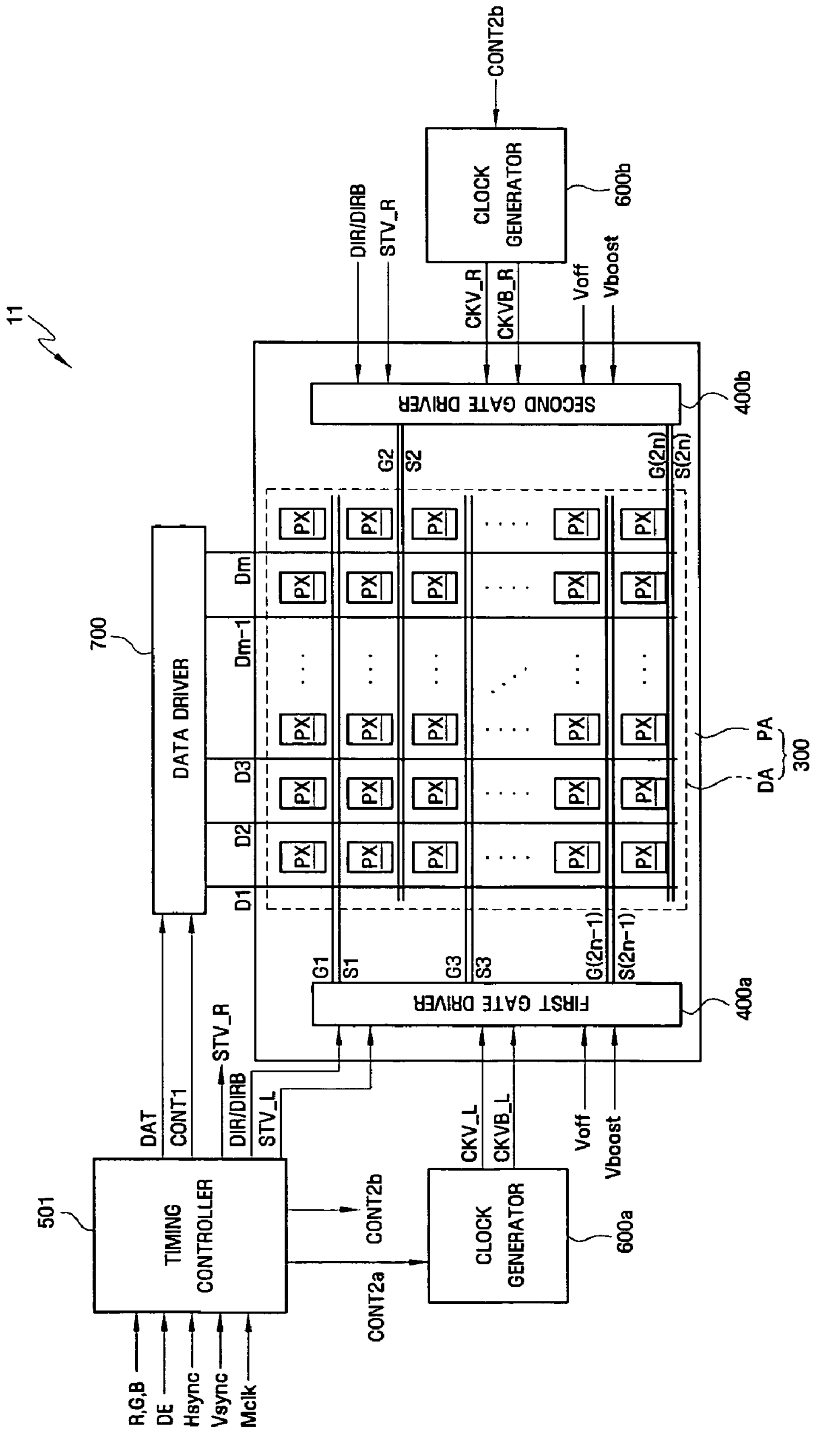
FIG. 8 is a block diagram of another exemplary embodiment of a liquid crystal display according to the present invention.
Figure 9:
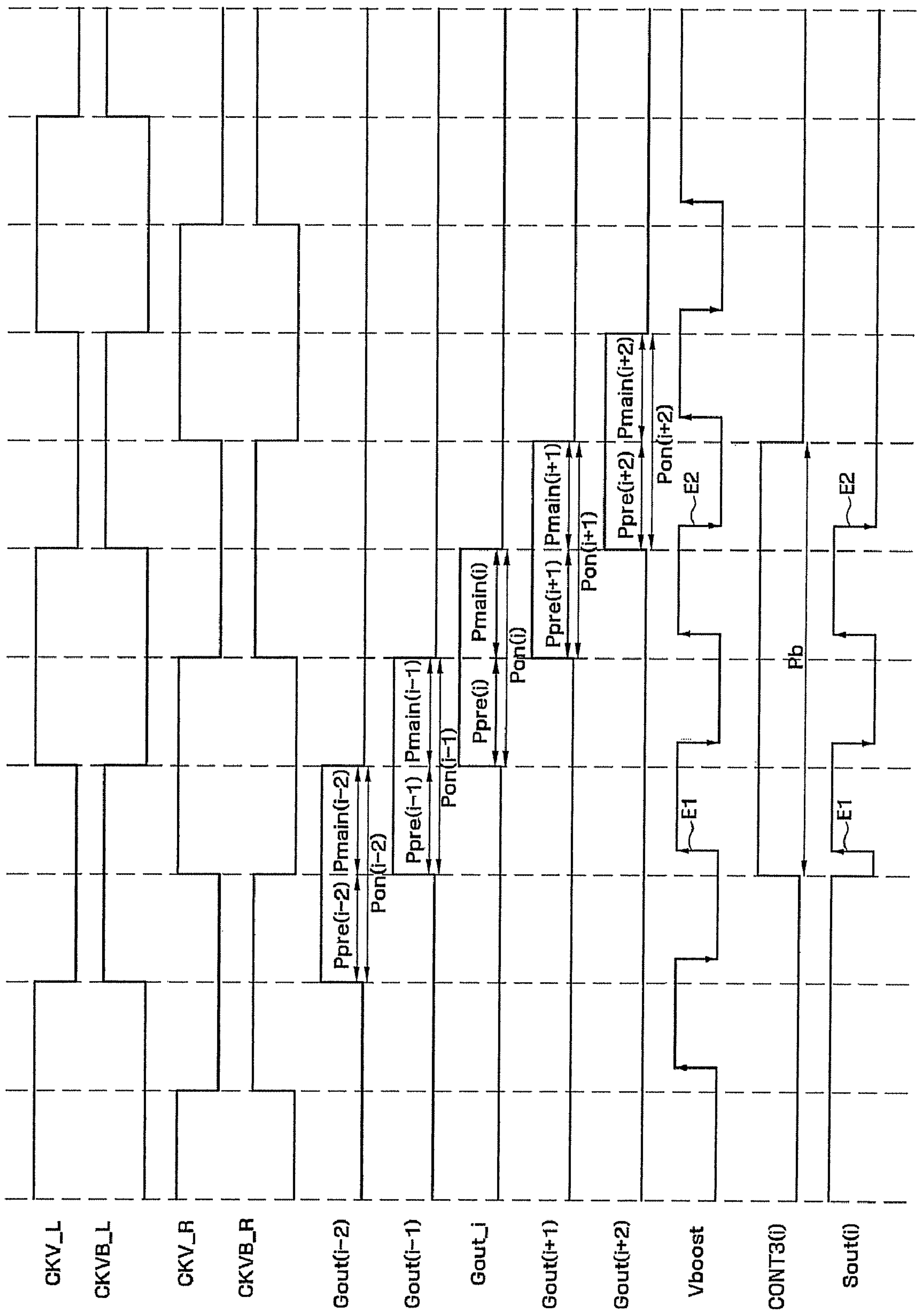
FIG. 9 is a signal waveform timing chart of an exemplary embodiment of an operation of the gate driver in FIG. 8, according to the present invention.
Figure 10:
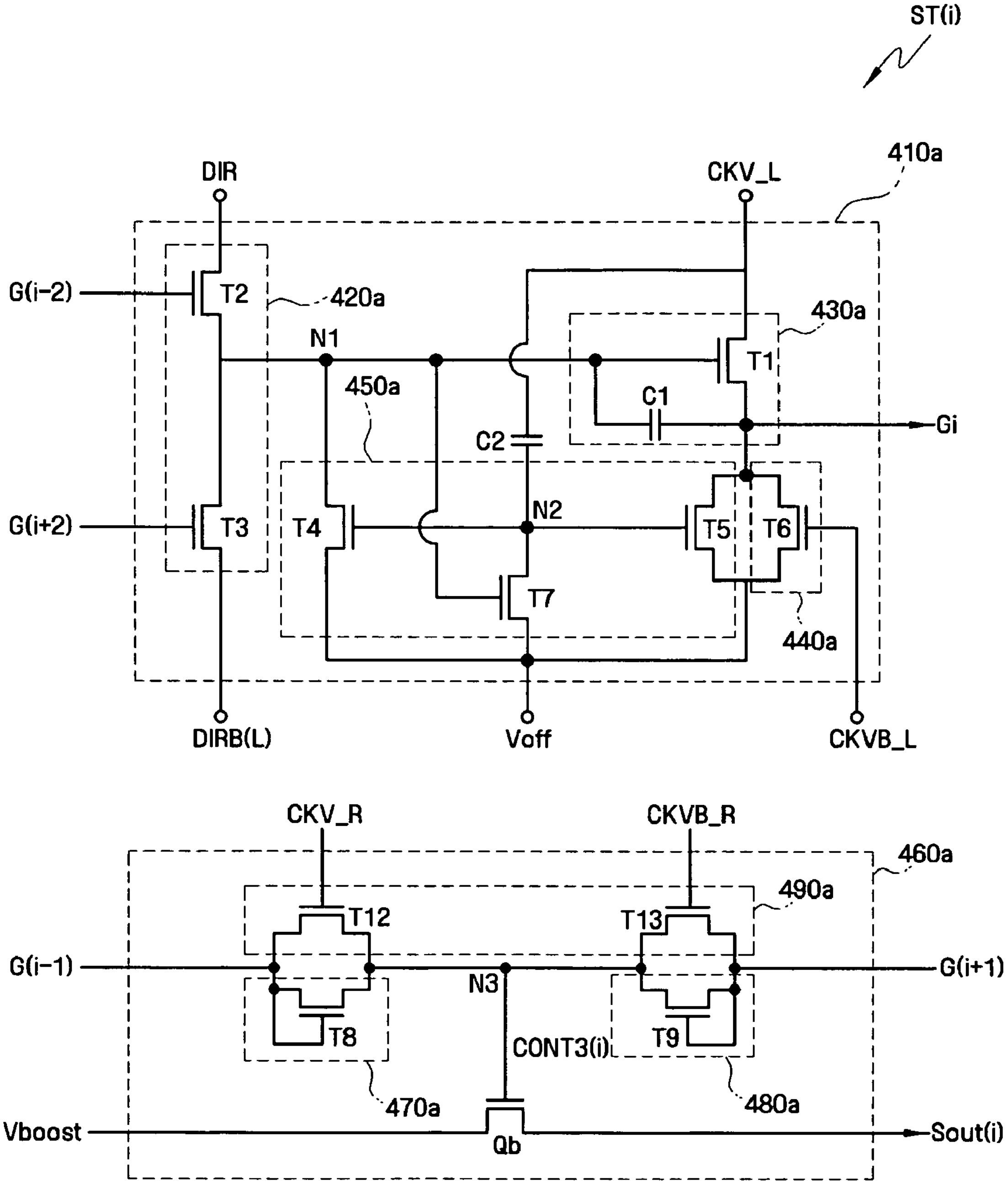
FIG. 10 is an equivalent schematic circuit diagram of the i-th stage.
Figure 11A:
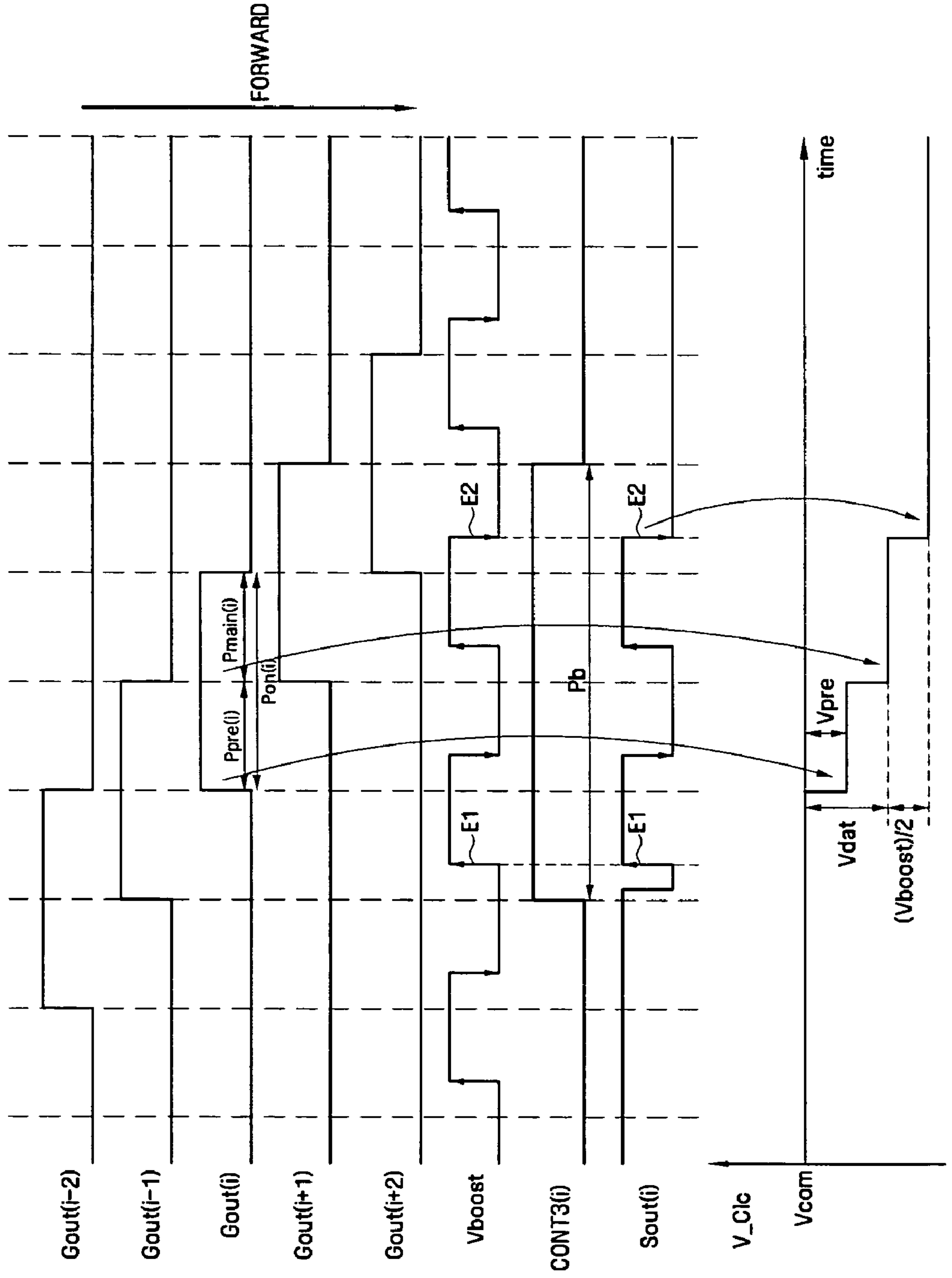
FIGS. 11A and 11B are signal waveform timing charts illustrating an exemplary embodiment of an operation of the liquid crystal display in FIG. 8.
Figure 11B:
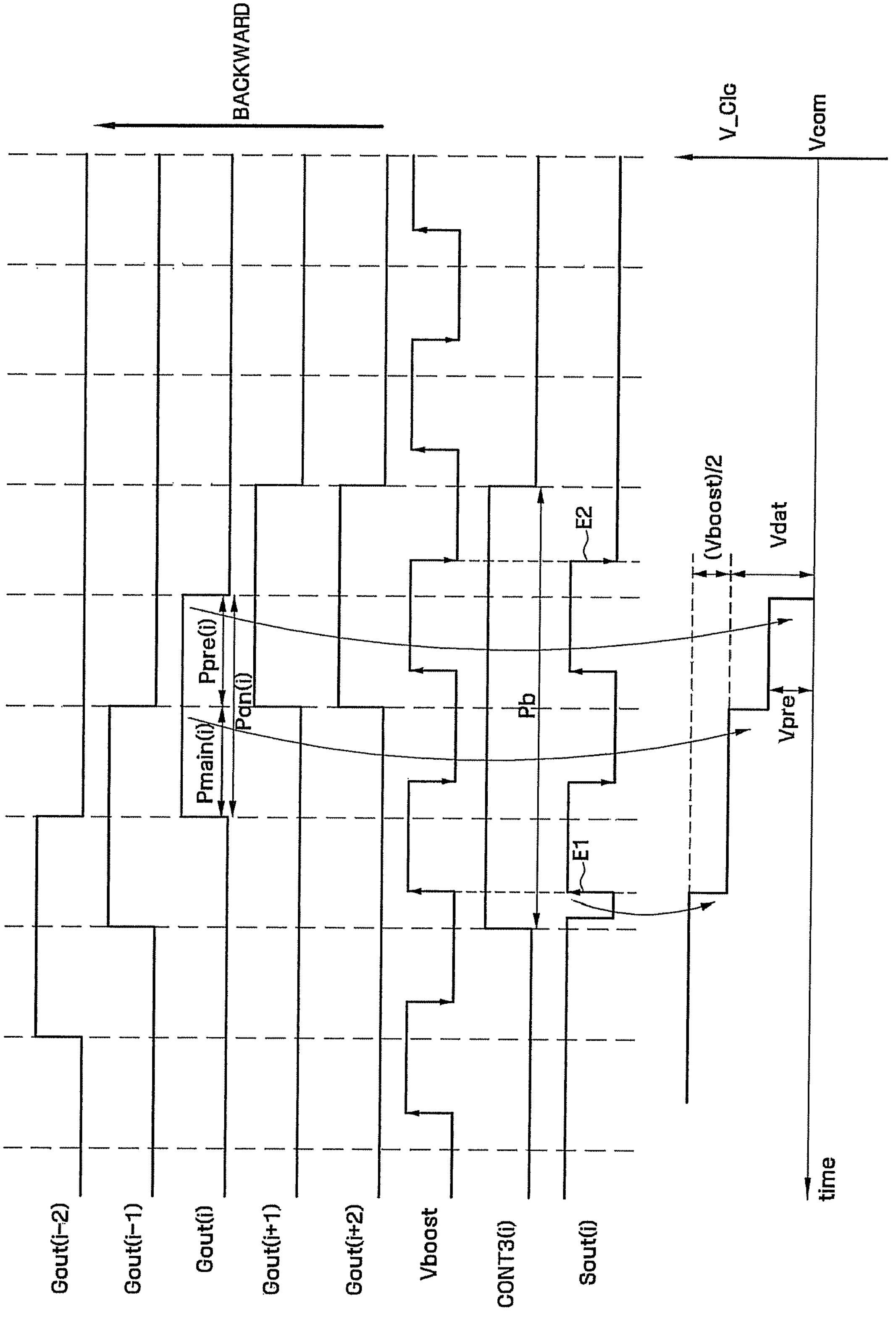

FIG. 8 is a block diagram of an exemplary embodiment of a liquid crystal display according to the present invention. FIG. 9 is a signal waveform timing chart illustrating an exemplary embodiment of an operation of the gate driver in FIG. 8. FIG. 10 is an equivalent schematic circuit diagram of an exemplary embodiment of the i-th stage. FIGS. 11A and 11B are signal waveform timing charts illustrating an exemplary embodiment of an operation of the liquid crystal display in FIG. 8.

Referring to FIG. 8, the LCD 11 according to an exemplary embodiment of the present invention includes an LCD panel 300, a timing controller 501, the first and the second clock generators 600*a*, and 600*b*, the first and second gate drivers 400*a* and 400*b*, and a data driver 700.

Each of the gate drivers 400*a*, 400*b* output the gate signals to a plurality of gate lines G1~G2*n*. For example, the first gate driver 400*a* is connected to odd-numbered gate lines G1~G(2*n*~1) among the gate lines G1~G2*n* and odd-numbered storage lines S1~S(2*n*~1) among the storage lines S1~S2*n*, and the second gate driver 402 is connected to even-numbered gate lines G2~G2*n* and even-numbered storage lines S2~S2*n*. According to an exemplary embodiment, the first and second drivers may not be apart from each other physically.

In more detail, the timing controller 501 supplies the first clock-generation-control signal CONT2*a* to the first clock generator 600*a*, and supplies the second clock-generation-control signal CONT2*b* to the second clock generator 600*b*. Also, the timing controller 501 supplies the first scan-start signal STV_L to the first gate driver 400*a*, and supplies the second scan-start signal STV_R to the second gate driver 400*b*. According to the current exemplary embodiment, the first scan start signal STV_L and the second scan start signal STV_R have a predetermined phase difference.

The first clock generator 600*a* receives the first clock-generation-control signal CONT2*a*, generates the first clock signal CKV_L and the first clock bar signal CKVB_L, and supplies the first clock signal CKV_L and the first clock bar signal CKVB_L to the first gate driver 400*a*. The second clock generator 600*b* receives the second clock-generation-control signal CONT2*b*, generates the second clock signal CKV_R, the second clock bar signal CKVB_R, and supplies the second clock signal CKV_R, the second clock bar signal CKVB_R to the second gate driver 400*b*. According to the current exemplary embodiment, the first clock signal CKV_L and the second clock signal CKV_R have a predetermined phase difference.

Next, the gate drivers 400*a*, and 400*b* are now described in more detail with reference to FIGS. 9 and 10, where the gate drivers 400*a* and 400*b* operate in the forward-scan mode.

Referring to FIG. 9, the first gate driver 400*a* outputs the (i−2)th gate signal Gout(i−2), the i-th gate signal Gout(i) and the (i+2)th gate signal Gout(i+2). The second gate driver 400*b* outputs the (i−1)th gate signal Gout(i−1) and the (i+1)th gate signal Gout(i+1). In the forward-scan mode, the (i−2)th turn-on period Pon(i−2) through the (i+2)th turn-on period Pon(i+2) begin sequentially as shown in FIG. 9.

The first gate driver 400*a* receives the first clock signal CKV_L and the first clock bar signal CKVB_μL and outputs the (i−2)th gate signal Gout(i−2), the i-th gate signal Gout(i) and the (i+2)th gate signal Gout(i+2). That is, the first gate driver 400*a* outputs the first clock bar signal CKVB_L as the (i−2)th gate signal Gout(i−2) during the (i−2)th turn-on period Pon(i−2), outputs the first clock signal CKV_L as the i-th gate signal Gout(i) during the i-th turn-on period Pon(i), and outputs the first clock bar signal CKVB_L as the (i+2)th gate signal Gout(+−2) during the (i+2)th turn-on period Pon (i+2).

The second gate driver 400*b* receives the second clock signal CKV_R and the second clock bar signal CKVB_R, and outputs the (i−1)th gate signal Gout(i−1) and the (i+1)th gate signal Gout(i+1). According to the current exemplary embodiment, the second clock signal CKV_R has a phase difference to that of the first clock signal CKV_L. That is, the second gate driver 400*b* outputs the second clock signal CKV_R as the (i−1)th gate signal Gout(i−1) during the (i−1) th turn-on period Pon(i−1), and outputs the second clock bar signal CKVB_R as the (i+1)th gate signal Gout(i+1) during the (i+1)th turn-on period Pon(i+1).

In the forward-scan mode, the (i−2)th turn-on period Pon (i−2) through (i+2)th turn-on period Pon(i+2) begin sequentially.

Each of the turn-on periods Pon(i−2) through Pon(i+2) overlaps the adjacent another turn-on period. Each of the turn-on periods Pon(i−2) through Pon(i+2) has a precharge-period Ppre(i−2) to Ppre(i+2) and a main-charge-period Pmain(i−2) to Pmain(i+2). The precharge-period Ppre(i) of the i-th turn-on period Pon(i) overlaps the main charge period Pmain(i−1) of the (i−1)th turn-on period Pon(i−1), and the main charge period Pmain(i) of the i-th turn-on period Pon(i) overlaps the precharge-period Ppre(i+1) of the (i+1)th turn-on period Pon(i+1).

The i-th stage STi of the first gate driver 400*a* is described hereinafter in further detail with reference to FIG. 10.

Referring to FIG. 10, the i-th stage STi includes a gate signal supplier 410*a* and a boost voltage supplier 460*a*. The gate signal supplier 410*a* outputs the i-th gate signal Gout(i) to the i-th gate line Gi, and the boost voltage supplier 460*a* outputs the boost voltage Sout(i) to the i-th storage line Si during the boost voltage-output period Pb.

The gate signal supplier 410*a* includes a pull-up-control unit 420*a*, a pull-up unit 430*a*, a pull-down unit 440*a* and a holding unit 450*a*. Further, referring to FIGS. 6 and 7, the pull-up-control unit 420*a* of the gate signal supplier 410*a* receives the (i−2)th gate signal Gout(i−2) and the (i+2)th gate signal Gout(i+2), and outputs the first clock signal CKV_L as the i-th gate signal Gout(i) during the i-th turn-on period Pon(i), as shown in FIG. 11.

The boost voltage supplier 460*a* outputs the boost voltage Sout(i) during the boost voltage-output period Pb according to the boost-control signal CONT3(i) as shown in FIG. 9. According to the current exemplary embodiment, the boost voltage Vboost includes edges E1 and E2. The edges E1 and E2 may be a rising edge and a falling edge, respectively. The i-th boost-control signal CONT3(i) includes the boost voltage-output period Pb. Here, the first edge E1 and the second edge E2 occur in the boost voltage-output period Pb, the i-th turn-on period Pon(i) occurs between the first edge E1 and the second edge E2. That is, the boost voltage-output period Pb overlaps the first edge E1, the i-th turn-on period Pon(i) and the second edge E2. Also, the boost voltage-output period Pb may overlap the (i−1)th turn-on period Pon(i−1) and the (i+1) th turn-on period Pon(i+1).

According to an exemplary embodiment, the boost voltage supplier 460*a* comprises the firsts switching element 470*a*, the second switching element 480*a* and a switching unit 490*a*. The first switching element 470*a* is a diode-connected transistor T8. The second switching element 480*a* is a diode-connected transistor T9. The switching unit 490*a* may include transistors T12 and T13.

The diode-connected transistor T8 supplies the (i−1)th gate signal Gout(i−1) to the third node N3 during the (i−1)th turn-on period Pon(i−1). According to an exemplary embodiment, when the transistor T12 of the switching unit 490*a* receives the second clock signal CKV_R and turned on supplies the (i−1)th gate signal Gout(i−1) to the third node N3. The diode-connected transistor T9 and the transistor T13 of the switching unit 490*a* are turned off.

The diode-connected transistor T9 supplies the (i+1)th gate signal Gout(i+1) to third node N3 during the (i+1)th turn-on period Pon(i+1). Here, the transistor T13 of the switching unit 490*a* receives the second clock bar signal CKVB_R and when turned on supplies the (i+1)th gate signal Gout(i+1) to the third node N3. The diode-connected transistor T8 and the transistor T12 of the switching unit 490*a* are turned off.

After the (i−1)th turn-on period Pon(i−1) and the (i+1)th turn-on period Pon(i+1), the transistors T12 and T13 of the switching unit 490*a* are enabled according the second clock signal CKV_R and the second clock bar signal CKVB_R, and supply the (i−1)th gate signal Gout(i−1) and the (i+1) the gate signal Gout(i+1) to the third node N3, respectively.

Therefore, the boost voltage supplier 460*a* generates the i-th boost-control signal CONT3(i) that has the boost voltage-output period Pb overlapping the (i−1)th turn-on period Pon (i−1) and the (i+1)th turn-on period Pon(i+1), as shown in FIG. 9.

The boost switching element Qb outputs the boost voltage Sout(i) in response to the i-th boost-control signal CONT3(i) during the boost voltage-output period Pb. The transistors T8, T9, T12, and T13 are a-Si TFTs.

Operations of the LCD in the forward-scan mode and reverse-scan mode are described with reference to FIGS. 3, 11A, and 11B.

The operation of the LCD in the forward-scan mode is described with reference to FIGS. 3 and 11A.

When the precharge-period Ppre(i) begins in the i-th turn-on period Pon(i), the pixel-switching element Qp is turned on, the data voltage applied to the liquid crystal capacitor (not shown) connected with the (i−1)th gate line G(i−1) is applied to the liquid crystal capacitor Clc connected to the i-th gate line G(i), and the liquid crystal capacitor Clc is pre-charged with the predetermined voltage Vpre, and the liquid crystal capacitor Clc is charged with an image-data voltage Vdat during the main-charge-period Pmain(i).

After the i-th turn-on period Pon(i), the pixel-switching element Qp is turned off, the storage capacitor Cst receives the second edge E2 of the boost voltage Vboost. When the falling edge E2 is supplied to the storage capacitor Cst, the voltage level of the storage capacitor Cst is lowered with respect to the common voltage Vcom, and the voltage level of liquid crystal capacitor Clc connected to the storage capacitor Cst is lowered with respect to the common voltage Vcom. For example, the capacitance of the storage capacitor Cst and the capacitance of the liquid crystal capacitor Clc are the same, and the voltage of the liquid crystal capacitor Clc is lowered by Vboost/2 according to the falling edge E2.

That is, the voltage of the liquid crystal capacitor Clc is decreased by the second edge E2, which is applied to the other of the storage capacitor Cst after the i-th turn-on period Pon(i) so that the difference between the boosted voltage of the liquid crystal capacitor Clc and the common voltage Vcom becomes large.

The operation of the LCD in the reverse-scan mode is described with reference to FIGS. 3 and 11B.

The (i+2)th through (i−2)th turn-on periods Pon(i+2)~Pon (i−2) begin sequentially.

The precharge-period Ppre(i) in the i-th turn-on period Pon(i) overlaps the main-charge-period Pmain(i+1) of the (i+1)th turn-on period (Pon(i+1)), and the main-charge-period Pmain(i) of the i-th turn-on period Pon(i)) overlaps the precharge-period Ppre(i−1) of the (i−1)th turn-on period Pon (i+1).

The boost voltage Vboost includes edges E1 and E2.

The i-th boost-control signal CONT3(i) includes the boost voltage-output period Pb. As described above, the first and second edges E1 and E2 occur in the boost voltage-output period Pb, the i-th turn-on period Pon(i) occurs between the first edge E1 and the second edge E2. That is, the boost voltage-output period Pb overlaps the first edge E1, the i-th turn-on period Pon(i) and the second edge E2. According to an exemplary embodiment, the boost voltage-output period Pb may overlap the (i−1)th turn-on period Pon(i−1) and the (i+1)th turn-on period Pon(i+1).

When the precharge-period Ppre(i) of the i-th turn-on period Pon(i) begins, the pixel-switching element Qp is turned on, the data voltage applied to the liquid crystal capacitor (not shown) connected with the (i+1)th gate line G(i+1) is applied to the liquid crystal capacitor Clc connected to the i-th gate line G(i), and the liquid crystal capacitor Clc is pre-charged with the predetermined voltage Vpre, and the liquid crystal capacitor Clc is charged with an image-data voltage Vdat during the main charge period Pmain(i).

After the i-th turn-on period Pon(i), the pixel-switching element Qp is turned off, the storage capacitor Cst receives the first edge E1 of the boost voltage Vboost. When the rising edge E1 is supplied to the storage capacitor Cst, the voltage level of the storage capacitor Cst is increased with respect to the common voltage Vcom, and the voltage level of liquid crystal capacitor Clc connected to the storage capacitor Cst is increased with respect to the common voltage Vcom. For example, the capacitance of the storage capacitor Cst and the capacitance of the liquid crystal capacitor Clc are the same, and the voltage of the liquid crystal capacitor Clc is increased by Vboost/2 according to the rising edge E1.

That is, when the boost voltage Vboost includes the first edge E1 and the second edge E2, the edges E1, and E2 occur during the boost voltage-output period Pb, and the i-th turn-on period Pon(i) occurs between the first edge E1 and the second edge E2, the voltage of liquid crystal capacitor Clc is boosted up or decreased in the forward-scan mode or the reverse-scan mode. According to an exemplary embodiment, the boost voltage-output period Pb may overlap with the (i−1)th turn-on period Pon(i−1) through the (i+1)th turn-on period.

However, the present invention is not limited thereto, and the boost voltage supplier 460*a* may be included in the second gate drivers 400*b*.

Figure 12:
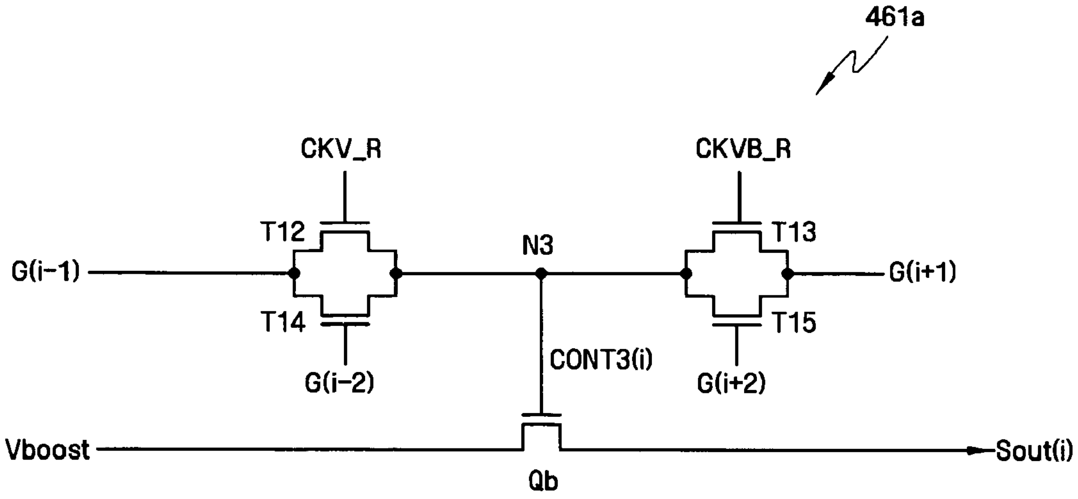
FIG. 12 is an equivalent schematic circuit diagram of another exemplary embodiment of a boost voltage supplier of a liquid crystal display according to the present invention.

An LCD according to another exemplary embodiment of the present invention is described hereinafter in further detail with reference to FIG. 12. FIG. 12 is an equivalent schematic circuit diagram of a boost voltage supplier of a liquid crystal display according to another exemplary embodiment of the present invention.

Referring to FIGS. 9, and 12, the boost voltage supplier 461*a* includes a first switching element T12, a second switching element T13, a third switching element T14, and a fourth switching element T15.

The first switching element T12 supplies the (i−1) gate signal Gout(i−1) to the third node N3 during the (i−1)th turn-on period Pon(i−1), and the second switching element T13 supplies the (i+1)th gate signal Gout(i+1) to the third node N3 during the (i+1)th turn-on period Pon(i+1), and the third switching element T14 supplies the (i−1)th gate signal Gout(i−1) to the third node N3 in the (i−2)th turn-on period Pon(i−2), and the fourth switching element T15 supplies the (i+1)th gate signal Gout(i+1) to the third node N3 in the (i+2)th turn-on period Pon(i+2).

In more detail, the third switching element T14 supplies the (i−1)th gate signal Gout(i−1) to the third node N3 during the precharge-period Ppre(i−2) in the (i−2)th turn-on period Pon (i−2) so that the i-th boost-control signal CONT3(i) is at low level during the (i−2)th turn-on period Pon(i−2).

The first switching element T12 receives the second clock signal CKV_R and is turned on and supplies the (i−1) gate signal Gout(i−1) to the third node N3 during the (i−1)th turn-on period Pon(i−1) so that the i-th boost-control signal CONT3(i) is at high level during the (i−1)th turn-on period Pon(i−1). Here, the second switching element T13 and the fourth switching element T15 are turned off.

The second switching element T13 receives the second clock bar signal CKVB_R and is turned on and supplies the (i+1) gate signal Gout(i+1) to the third node N3 during the (i+1) turn-on period Pon(i+1) so that the i-th boost-control signal CONT3(i) is at high level during the (i+1)th turn-on period Pon(i+1). Here, the first switching element T12 and the third switching element T14 are turned off.

The fourth switching element T15 supplies the (i+1)th gate signal Gout(i+1) to the third node N3 during the main-charge-period Pmain(i+2) in the (i+2)th turn-on period Pon(i+2) so that the i-th boost-control signal CONT3(i) is at low level during the (i−2)th turn-on period Pon(i−2). According to the current exemplary embodiment, the switching elements T12~T15 are a-Si TFTs.

That is, the first through fourth switching elements T12~15 supply the i-th boost-control signal CONT3(i) to the third node N3 during the boost voltage-output period Pb as shown in the FIG. 9. Here the boost voltage-output period Pb may overlap the (i−1)th turn-on period Pon(i−1) and the (i+1)th turn-on period Pon(i+1).

Figure 13:
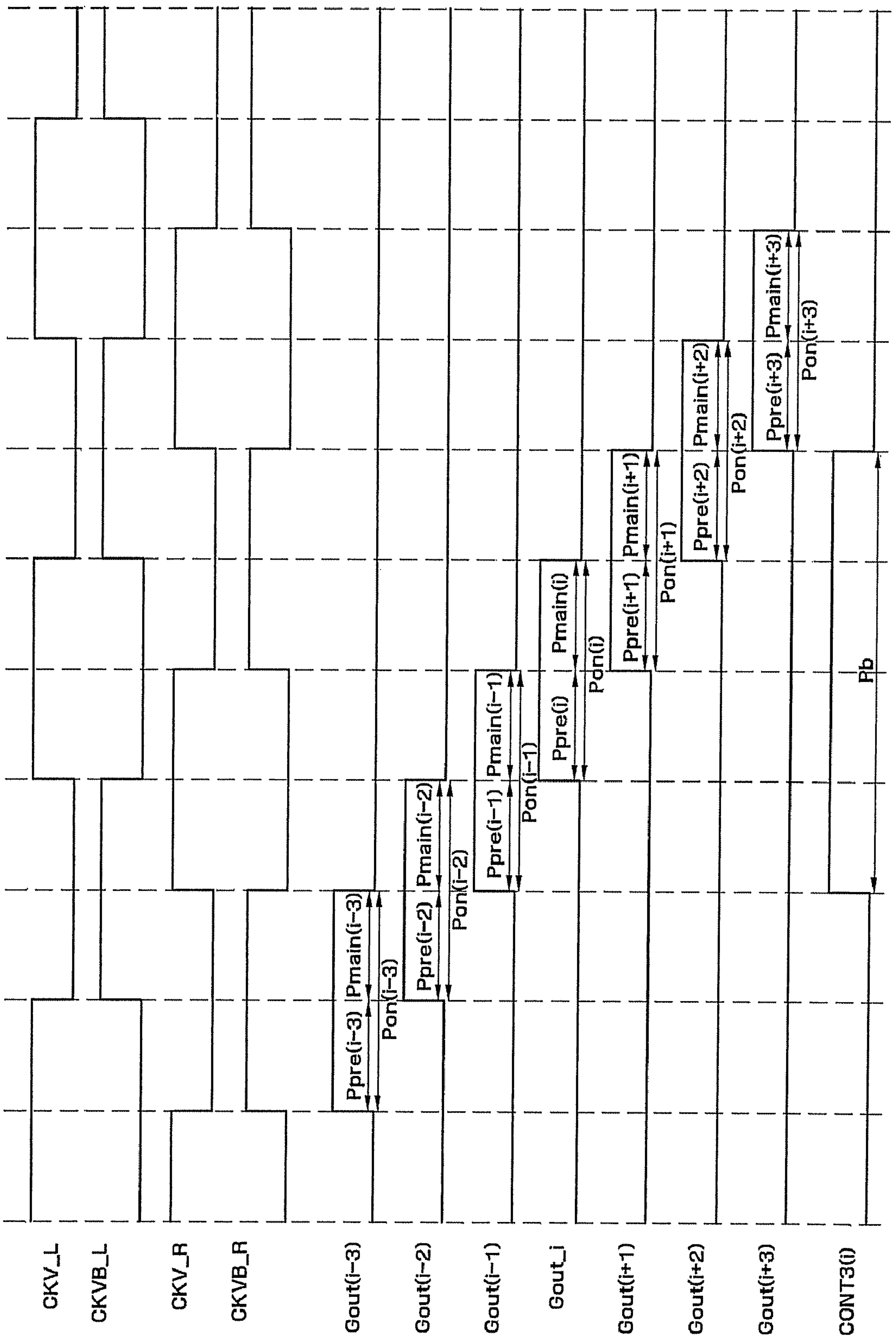
FIG. 13 is an equivalent schematic circuit diagram of another exemplary embodiment of a boost voltage supplier of a liquid crystal display according to the present invention.

An LCD according to another exemplary embodiment of the present invention is described hereinafter in further detail with reference to FIGS. 13 and 14. FIG. 13 is an equivalent schematic circuit diagram of a boost voltage supplier of a liquid crystal display according to another exemplary embodiment of the present invention, and FIG. 14 is a signal waveform timing chart illustrating an operation of the boost voltage supplier in FIG. 13.

Figure 14:
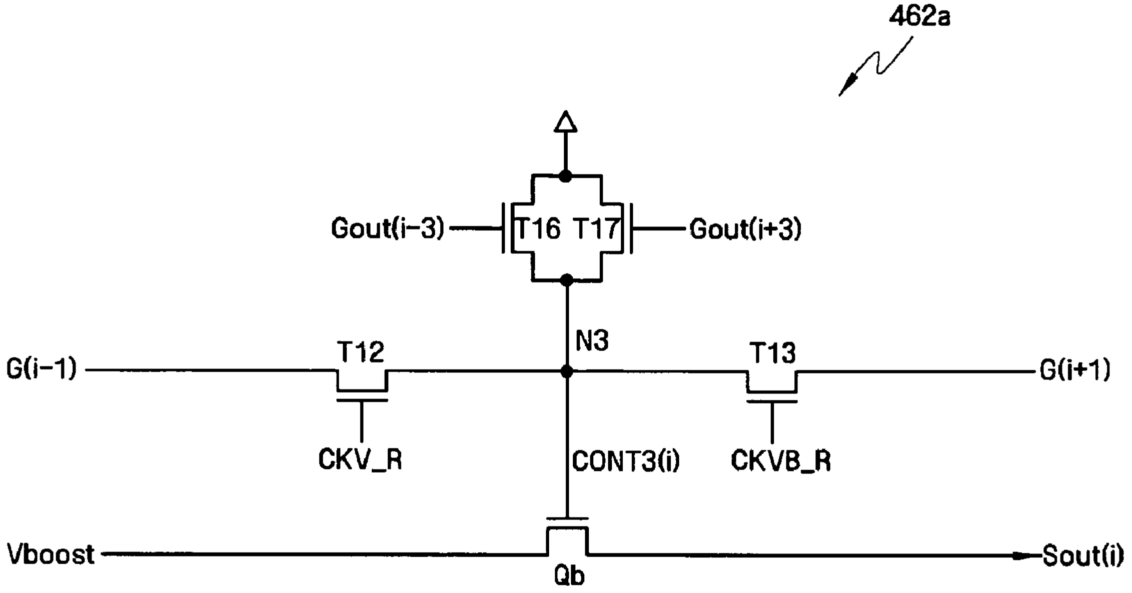
FIG. 14 is a signal waveform timing chart illustrating another exemplary embodiment an operation of the boost voltage supplier in FIG. 13.

Referring to FIGS. 13 and 14, the boost voltage supplier 462*a* includes a first switching element T12, a second switching element T13, and switching units T16, T17.

The first switching element T12 supplies the (i−1)th gate signal Gout(i−1) to the third node N3 during the (i−1)th turn-on period Pon(i−1). The second switching element T13 supplies the (i+1) gate signal Gout(i+1) to the third node N3. The switching unit T16, T17 supplies the ground voltage to the third node N3.

The third switching element T16 receives the (i−3)th gate signal Gout(i−3) during the (i−3)th turn-on period Pon(i−3) and when turned on supplies the ground voltage to the third node N3 so that the i-th boost-control signal CONT3(i) is at low level during the (i−3)th turn-on period Pon(i−3).

The first switching element T12 receives the second clock signal CKV_R during the (i−1)th turn-on period Pon(i−1) and when turned on supplies the (i−1)th gate signal Gout(i−1) to the third node N3 so that the i-th boost-control signal CONT3(i) is at high level during the (i−1)th turn-on period Pon(i−1). The second switching element T13 and the fourth switching element T17 are turned off.

Next, during the (i+1)th turn-on period (Pon(i+1), the second switching element T13 receives the second clock bar signal CKVB_R and is turned on and supplies the (i+1)th gate signal Gout(i+1) to the third node N3 so that the boost-control signal CONT3(i) is at high level during the (i+1)th turn-on period Pon(i+1). The first switching element T12 and the third switching element T16 are turned off.

Next, the fourth switching element T17 receives the (i+3) gate signal Gout(i+3) during the (i+3)th turn-on period Pon (i+3) and is turned on and supplies the ground voltage to the third node N3 so that the i-th boost-control signal CONT3(i) is at low level during the (i+3)th turn-on period Pon(i+3). According to the current exemplary embodiment, the switching elements T12, T13, T16, and T17 are a-Si TFTs.

That is, the first through fourth switching elements T12, T13, T16, and T17 supply the i-th boost-control signal CONT3(i) at high level during the boost voltage-output period Pb to the third node N3 as shown in FIG. 13. According to the current exemplary embodiment, the boost voltage-output period Pb overlaps the (i−1)th turn-on period Pon(i−1) and the (i+1)th turn-on period Pon(i+1).

As described above, according to the liquid crystal display and the driving method of the same of present invention, power consumption is decreased in the forward-scan mode and the reverse-scan mode.

While the present invention has been shown and described with reference to some exemplary embodiments thereof, it should be understood by those of ordinary skill in the art that various changes in form and details may be made therein without departing from the spirit and scope of the present invention as defined by the appending claims.

What is claimed is:

1. A liquid crystal display comprising:

a liquid crystal capacitor charged with a data voltage during a first turn-on period of a first gate signal;

a storage capacitor having an electrode connected to the liquid crystal capacitor; and a driving unit which supplies a boost voltage to another electrode of the storage capacitor during a boost voltage-output period of a boost-control signal, wherein the boost voltage includes a first edge and a second edge, the first and second edges occur in the boost voltage-output period, and the first turn-on period occurs between the first and second edges, and, wherein the data voltage of liquid crystal capacitor is boosted up or decreased by the first edge or the second edge supplied to the other electrode of the storage capacitor after the first turn-on period.

2. The liquid crystal display of claim 1, further comprising:

a first gate line connected to the liquid crystal capacitor, which receives the first gate signal; and a second gate line connected to the liquid crystal capacitor, which receives a second gate signal having a second turn-on period, wherein the second turn-on period begins after a first turn-on period begins in a forward-scan mode, while the first turn-on period begins after the second turn-on period begins in a reverse-scan mode.

3. The liquid crystal display of claim 2, wherein the data voltage of liquid crystal capacitor is boosted up or decreased after the first turn-on period in the forward-scan mode and in the reverse-scan mode, respectively.

4. The liquid crystal display of claim 2, wherein, in the forward-scan mode, the first edge is supplied to the other electrode of the storage capacitor after the first turn-on period, and the voltage of liquid crystal capacitor is boosted up or decreased, while, in the reverse-scan mode, the second edge is supplied to the other electrode of the storage capacitor after the first turn-on period, and the voltage of liquid crystal capacitor is boosted up or decreased.

5. A liquid crystal display comprising:

first to n-th gate lines;

a liquid crystal capacitor connected to the $i(1 \leqq i \leqq n)$-th gate line;

a storage capacitor having an electrode connected to the liquid crystal capacitor; and a gate driver which supplies first to n-th gate signals to the first to n-th gate lines and which supplies a boost voltage to another electrode of the storage capacitor during a boost voltage-output period of a boost-control signal, each of the first to n-th gate signals having first to n-th turn-on periods, respectively, wherein the liquid crystal capacitor is charged with a data voltage during the i-th turn-on period, and a voltage of the liquid crystal capacitor is boosted up or decreased according to the boost voltage after the i-th turn-on period in a forward-scan the mode in which the first to n-th turn-on period begins sequentially, or in the reverse-scan mode in which the n-th to first turn-on period begins sequentially.

6. The liquid crystal display of claim 5, wherein the gate driver comprises first to n-th stages, the i-th stage comprising a gate signal supplier which outputs the i-th gate signal and a boost voltage supplier which supplies the boost voltage to the other electrode of the storage capacitor during the boost voltage-output period.

7. The liquid crystal display of claim 6, wherein the boost voltage supplier comprises:
- a boost-control signal generator which generates the boost-control signal having the boost voltage-output period, and
- a switching unit being enabled during the boost voltage-output period and supplies the boost voltage to the other electrode of the storage capacitor.

8. The liquid crystal display of claim 7, wherein the boost voltage-output period overlaps the (i−1)th turn-on period of the (i−1)th gate signal and the (i+1)th turn-on period of the (i+1)th gate signal.

9. The liquid crystal display of claim 8, wherein the boost-control signal generator outputs the boost-control signal to an output node, the boost-control signal generator comprising:
- a first switching element which supplies the (i−1)th gate signal at a first level to the output node during the (i−1)th turn-on period;
- a second switching element which supplies the (i+1)th gate signal at the first level to the output node during the (i+1)th turn-on period; and
- a switching unit changes the output node to a second level after the (i−1)th turn-on period and the (i+1)th turn-on period.

10. The liquid crystal display of claim 9, wherein the first and second switching elements are diode-connected amorphous silicon thin film transistors, respectively, and the switching unit comprises an amorphous silicon thin film transistor.

11. The liquid crystal display of claim 8, wherein the boost-control signal generator outputs the boost-control signal to an output node, the boost-control signal generator comprising:
- a first switching element which supplies the (i−1)th gate signal at a first level to the output node during the (i−1)th turn-on period;
- a second switching element which supplies the (i+1)th gate signal at the first level to the output node during the (i+1)th turn-on period;
- a third switching element which supplies the (i−1)th gate signal at a second level to the output node during at least one portion of the (i−2)th turn-on period; and
- a fourth switching element which supplies the (i+1)th gate signal at the second level to the output node during at least one portion of the (i+2)th turn-on period.

12. The liquid crystal display of claim 11, wherein the first to fourth switching elements are amorphous silicon thin film transistors, respectively.

13. The liquid crystal display of claim 6, wherein the boost voltage comprises a first edge and a second edge, the first and second edges occur in the boost voltage-output period, and the first turn-on period occurs between the first and second edges.

14. The liquid crystal display of claim 13, wherein the data voltage of liquid crystal capacitor is boosted up or decreased by the first edge or the second edge supplied to the other electrode of the storage capacitor after the i-th turn-on period.

15. The liquid crystal display of claim 6, wherein the gate signal supplier comprises an amorphous silicon thin film transistor which outputs the i-th gate signal.

16. A method of driving a liquid crystal display including first to n-th gate lines, a liquid crystal capacitor connected to the i($1 \leqq i \leqq n$)-th gate line and a storage capacitor having an electrode connected to the liquid crystal capacitor, the method comprising:
- supplying i-th gate signal having i-th turn-on period to the i-th gate line, and
- supplying a boost voltage to another electrode of the storage capacitor during a boost voltage-output period of a boost-control signal, the boost voltage having a first edge and a second edge, the first and second edges occur in the boost voltage-output period, and the first turn-on period occurs between the first and second edges,
- charging the liquid crystal capacitor with a data voltage during the i-th turn-on period, boosting up or decreasing the data voltage of the liquid crystal capacitor according to the first edge or the second edge after the i-th turn-on period.

17. The method of claim 16, wherein supplying the boost voltage comprises:
- generating the boost-control signal having the boost voltage-output period, and
- supplying the boost voltage to the other electrode of the storage capacitor.

18. The method of claim 17, wherein generating the boost-control signal comprises overlapping the boost voltage-output period with the (i−1)th turn-on period of the (i−1)th gate signal and the (i+1)th turn-on period of the (i+1)th gate signal.

* * * * *